(12) United States Patent
Ladurner et al.

(10) Patent No.: US 12,345,551 B2
(45) Date of Patent: Jul. 1, 2025

(54) CONTACTLESS MAGNETIC SENSING TRIGGER SYSTEM

(71) Applicant: Infineon Technologies AG, Neubiberg (DE)

(72) Inventors: Sebastian Ladurner, Feldkirchen-Westerham (DE); Richard Heinz, Munich (DE); Sigmund Zaruba, Unterhaching (DE); Severin Neuner, Valley (DE)

(73) Assignee: Infineon Technologies AG, Neubiberg (DE)

( * ) Notice: Subject to any disclaimer, the term of this patent is extended or adjusted under 35 U.S.C. 154(b) by 169 days.

(21) Appl. No.: 18/302,300

(22) Filed: Apr. 18, 2023

(65) Prior Publication Data

US 2024/0060798 A1 Feb. 22, 2024

Related U.S. Application Data

(63) Continuation-in-part of application No. 17/820,411, filed on Aug. 17, 2022, now Pat. No. 11,971,459.

(51) Int. Cl.
*G01D 5/14* (2006.01)
*G01D 5/16* (2006.01)

(52) U.S. Cl.
CPC .............. *G01D 5/145* (2013.01); *G01D 5/16* (2013.01)

(58) Field of Classification Search
CPC .............. G01R 33/072; G01R 33/0005; G01R 33/0206
See application file for complete search history.

(56) References Cited

U.S. PATENT DOCUMENTS

| 5,115,175 A | 5/1992 | Fletcher |
| 2011/0298452 A1 | 12/2011 | Mao et al. |

(Continued)

FOREIGN PATENT DOCUMENTS

| CN | 110840515 A | 2/2020 |
| DE | 202013104844 U1 | 2/2014 |
| WO | 2019084505 A1 | 5/2019 |

OTHER PUBLICATIONS

Co-pending U.S. Appl. No. 17/820,411, inventors Ladurner; Sebastian et al., filed Aug. 17, 2022.

(Continued)

*Primary Examiner* — Alvaro E Fortich
(74) *Attorney, Agent, or Firm* — Harrity & Harrity, LLP

(57) ABSTRACT

A sensor system may include a magnet arranged such that a linear position of the magnet corresponds to a position of a trigger element on a substantially linear trajectory, and such that an angular position of the magnet corresponds to a selected position of a selection element, the selected position being one of a plurality of selected positions. The sensor system may include a magnetic sensor to determine the position of the trigger element based on a strength of a first magnetic field component and a strength of a second magnetic field component, and determine the selected position of the selection element based on a strength of a third magnetic field component and the strength of the second magnetic field component. The first magnetic field component, the second magnetic field component, and the third magnetic field component may be perpendicular to each other.

20 Claims, 16 Drawing Sheets

(56) References Cited

U.S. PATENT DOCUMENTS

| | | | |
|---|---|---|---|
| 2014/0100687 A1 | 4/2014 | Ekstrom et al. | |
| 2016/0220150 A1* | 8/2016 | Sharonov | |
| 2019/0063679 A1* | 2/2019 | Mergener | B25F 5/00 |
| 2019/0314946 A1* | 10/2019 | Dey, IV | B23G 1/225 |
| 2020/0300927 A1* | 9/2020 | Moriya | G01P 3/487 |
| 2022/0055197 A1* | 2/2022 | Yoshikane | B25D 17/00 |
| 2022/0055198 A1* | 2/2022 | Yoshikane | B25D 11/06 |
| 2023/0025582 A1 | 1/2023 | Nield | |

OTHER PUBLICATIONS

"Hall-Trigger-EVM User's Guide," Texas Instruments, Dec. 2021, 7 Pages.

Christen Waite, "Increasing surgical drill trigger precision and control with inductive and Hall-effect sensors," Analog—Technical articles, Oct. 14, 2022, 4 Pages.

"Design Guide—Contactless, Hall-Effect Variable-Speed Trigger Reference Design With External Field Protection," Texas Instruments, Dec. 2021, 42 Pages.

"Hall-effect magnetic sensor—Low power consumption," Melexis, Website: https://www.melexis.com/en/product/mlx92213/micropower-low-voltage-hall-effect-latch, 2023, 13 Pages.

"Low-Noise Linear Hall-Effect Sensor ICs with Analog Output," Allegro Microsystems, A1324-DS, Rev. 9, Jun. 16, 2022, 13 Pages.

Ti Kevin, "Improving variable-speed trigger switches in power tools through capacitive sensing," Industrial—Technical articles, Jul. 21, 2016, 4 Pages.

* cited by examiner

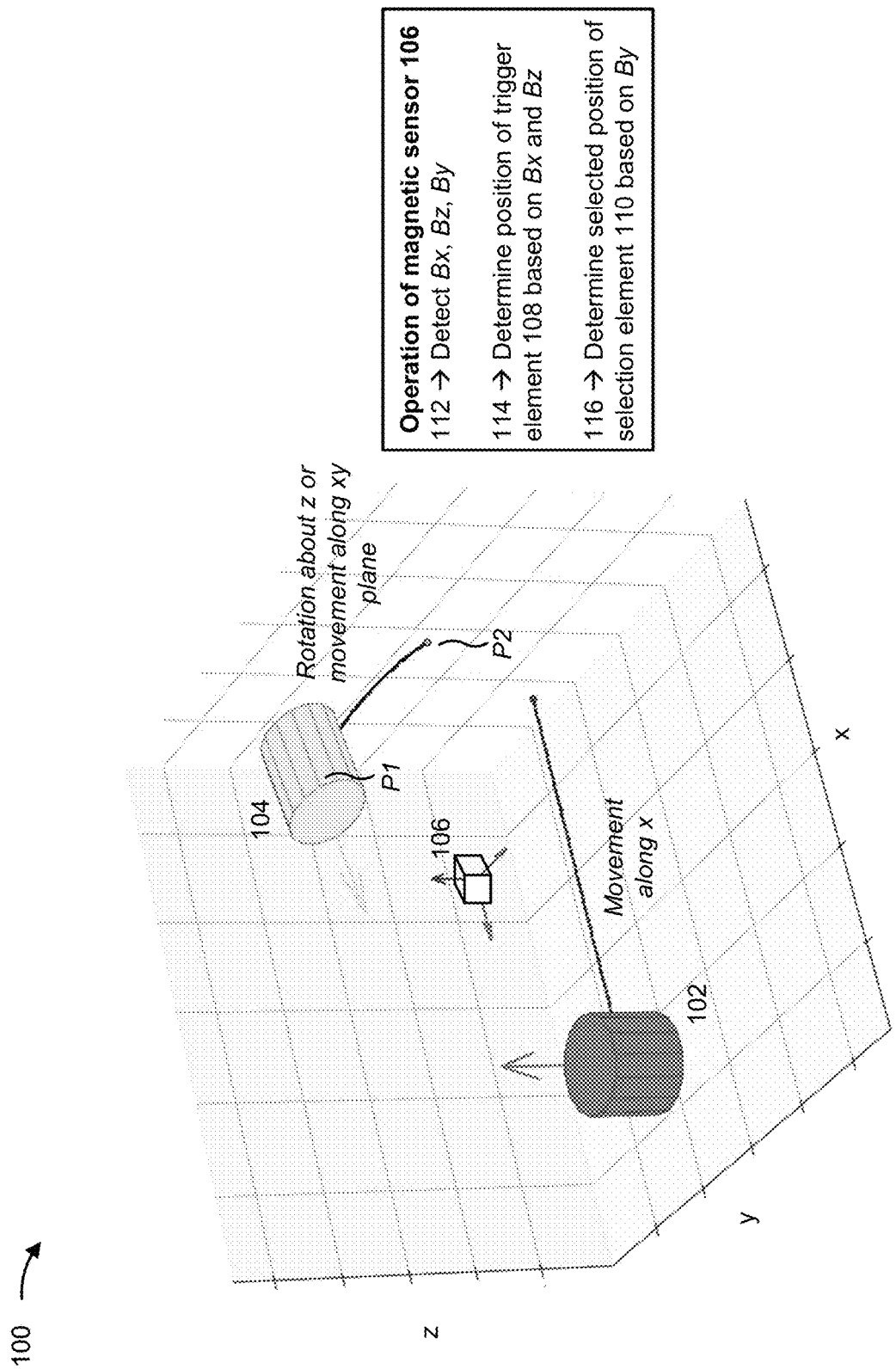

CONTACTLESS MAGNETIC SENSING TRIGGER SYSTEM

CROSS-REFERENCE TO RELATED APPLICATION

This Patent Application is a continuation-in-part of U.S. patent application Ser. No. 17/820,411, filed on Aug. 17, 2022, and entitled "CONTACTLESS MAGNETIC SENSOR TRIGGER SYSTEM." The disclosure of the prior Application is considered part of and is incorporated by reference into this Patent Application.

BACKGROUND

A magnetic sensor is a device capable of sensing a magnetic field strength and providing an output signal that can be used to determine, for example, a linear position of an object, a position of an object in a three-dimensional (3D) space, an angle of rotation of an object, a speed of an object, a direction of movement of an object, or an electrical current, among other examples. One type of magnetic sensor is a Hall-based sensor, which is a magnetic sensor capable of detecting a strength of a magnetic field using the Hall effect, with an output voltage of the Hall-based sensor being directly proportional to the strength of the field.

SUMMARY

In some implementations, a sensor system includes a first magnet arranged such that a position of the first magnet corresponds to a position of a trigger element on a linear trajectory; a second magnet arranged such that a position of the second magnet corresponds to a selected position of a selection element, the selected position being one of a plurality of selectable positions; and a magnetic sensor to: detect a strength of a first magnetic field component, a strength of a second magnetic field component, and a strength of a third magnetic field component, wherein the first magnetic field component, the second magnetic field component, and the third magnetic field component are perpendicular to each other, determine the position of the trigger element based on the strength of the first magnetic field component and the strength of the second magnetic field component, and determine the selected position of the selection element based on the strength of the third magnetic field component.

In some implementations, a device includes a first element moveable along a first axis; a first magnet affixed to the first element such that a position of the first magnet represents a position of the first element with respect to the first axis; a second element rotatable about or moveable on a second axis; a second magnet affixed to the second element such that a position of the second magnet represents a selected position of the second element with respect to the second axis, the selected position being one of a plurality of selectable positions; and a magnetic sensor to: determine the position of the first element based on a strength of a first magnetic field component and a strength of a second magnetic field component, wherein the first magnetic field component is perpendicular to the second magnetic field component, and determine the selected position of the second element based on a strength of a third magnetic field component, wherein the third magnetic field component is perpendicular to the first magnetic field component and to the second magnetic field component.

In some implementations, a method includes detecting, by a magnetic sensor, a strength of a first magnetic field component, a strength of a second magnetic field component, and a strength of a third magnetic field component, wherein the first magnetic field component, the second magnetic field component, and the third magnetic field component are perpendicular to each other; determining, by the magnetic sensor, a position of a first element based on the strength of the first magnetic field component and the strength of the second magnetic field component, wherein a position of a first magnet corresponds to the position of the first element; and determining, by the magnetic sensor, a position of a second element based on the strength of the third magnetic field component, wherein a position of a second magnet corresponds to the position of the second element.

In some implementations, a sensor system includes a magnet arranged such that: a linear position of the magnet corresponds to a position of a trigger element on a substantially linear trajectory, and an angular position of the magnet corresponds to a selected position of a selection element, the selected position being one of a plurality of selected positions; and a magnetic sensor to: determine the position of the trigger element based on a strength of a first magnetic field component and a strength of a second magnetic field component, and determine the selected position of the selection element based on a strength of a third magnetic field component and the strength of the second magnetic field component, wherein the first magnetic field component, the second magnetic field component, and the third magnetic field component are perpendicular to each other.

In some implementations, a device includes a first element moveable along a first axis; a second element rotatable about or moveable on a second axis; a first magnet arranged such that a linear position of the first magnet represents a position of the first element with respect to the first axis; a second magnet arranged such that an angular position of the second magnet represents a selected position of the second element with respect to the second axis, the selected position being one of a plurality of selectable positions; and a magnetic sensor to: determine the linear position of the first element based on a strength of a first magnetic field component and a strength of a second magnetic field component, and determine the selected position of the second element based at least in part on a strength of a third magnetic field component.

In some implementations, a method includes determining, by a magnetic sensor, a linear position of a first element based on a strength of a first magnetic field component and a strength of a second magnetic field component, wherein a linear position of a magnet corresponds to the linear position of the first element; and determining, by the magnetic sensor, a selected position of a second element based on a strength of a third magnetic field component and the strength of the second magnetic field component, wherein an angular position of the magnet corresponds to the selected position of the second element.

BRIEF DESCRIPTION OF THE DRAWINGS

FIGS. 1A and 1B are diagrams illustrating an example associated with a contactless magnetic sensing trigger system described herein.

DETAILED DESCRIPTION

Figure 1B:
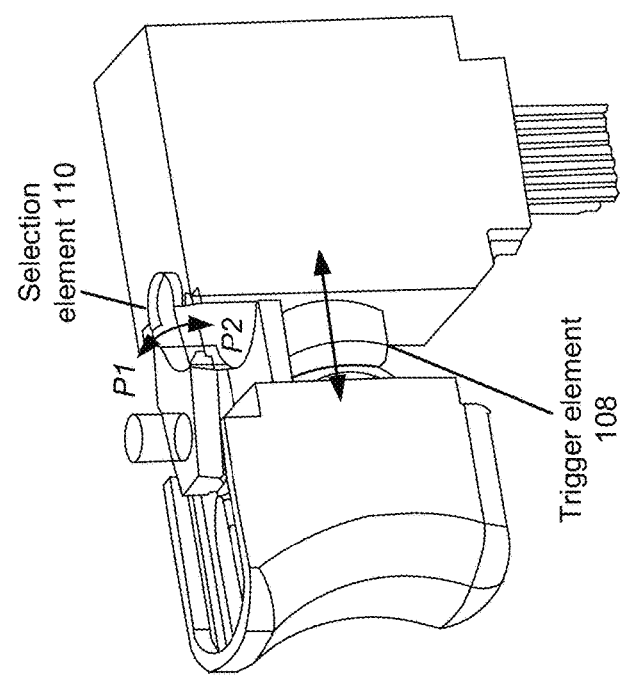

The following detailed description of example implementations refers to the accompanying drawings. The same reference numbers in different drawings may identify the same or similar elements.

A device may include a trigger that can be manipulated by a user in association with operating the device. For example, a power tool, such as a power drill, may include a trigger that can be manipulated by the user in order to enable control a rotational speed of a motor of the power drill. Conventionally, such a trigger is configured with a resistive potentiometer to enable detection of a position of the trigger, and the rotational speed of the motor can be controlled based on the position of the trigger. Such a device may further include a selection knob that can be manipulated by the user in association with operating the device. For example, in addition to a trigger, a power drill may include a selection knob that can be manipulated by the user in order to enable control of a rotational direction of the motor (e.g., such that a first selected position causes the motor to rotate in a first direction, while a second selected position causes the motor to rotate in a second (opposite) direction). Generally, the selection knob is placed above or near the trigger, and a resistive potentiometer can be used to enable detection of a position of the selection knob. The trigger functionality and the selection knob functionality are in some cases combined within a single system.

However, position detection using a resistive potentiometer has some disadvantages. For example, elements needed to implement detection based on the resistive potentiometer measurement principle require physical contact, and these elements can wear out or degrade over time due to, for example, humidity, exposure to extreme temperature, particle contamination (e.g., dust), limited material durability, or other effects. Therefore, position detection using a resistive potentiometer may become unreliable or error-prone, meaning that control of a device using a trigger or a selection knob may become degraded or impossible.

Some implementations described herein provide a contactless magnetic sensing trigger system. In some implementations, a sensor system may include a first magnet arranged such that a position of the first magnet corresponds to a position of a trigger element on a linear trajectory, and a second magnet arranged such that a position of the second magnet corresponds to a selected position of a selection element. The sensor system may further include a magnetic sensor to detect a strength of a first magnetic field component, a strength of a second magnetic field component, and a strength of a third magnetic field component, determine the position of the trigger element based on the strength of the first magnetic field component and the strength of the second magnetic field component, and determine the selected position of the selection element based on the strength of the third magnetic field component.

In some implementations, a sensor system may include a magnet arranged such that (1) a linear position of the magnet corresponds to a position of a trigger element on a substantially linear trajectory, and (2) an angular position of the magnet corresponds to a selected position of a selection element. The sensor system may further include a magnetic sensor to determine the position of the trigger element based on a strength of a first magnetic field component and a strength of a second magnetic field component, and determine the selected position of the selection element based on a strength of a third magnetic field component and the strength of the second magnetic field component.

Notably, the use of the magnetic sensor and the one or more magnets provide contactless measurement of the position of the trigger element and contactless detection of the selected position of the selection element. As a result, the sensor system described herein overcomes the disadvantages of a resistive potentiometer measurement system (e.g., by eliminating a need for physical contact), thereby improving reliability and performance in association with controlling a device (e.g., a power tool) that includes the trigger element and the selection element. Additional details are provided below.

FIGS. 1A and 1B are diagrams illustrating an example associated with a contactless magnetic sensing trigger system 100. As shown in FIGS. 1A and 1B, the contactless magnetic sensing trigger system 100 includes a first magnet 102, a second magnet 104, a magnetic sensor 106, a trigger element 108, and a selection element 110. In some implementations, the contactless magnetic sensing trigger system 100 may be included in a power tool, such as a power drill.

The first magnet 102 is a magnet the influences a magnetic field in an environment of the magnetic sensor 106. In some implementations, the first magnet 102 includes two opposite poles on two portions of the first magnet 102 (e.g., a north pole on a first half of the first magnet 102, a south pole on a second half of the first magnet 102). For example, in some implementations, the first magnet 102 may include a dipole magnet (e.g., a dipole bar magnet, a circular dipole magnet, an elliptical dipole magnet, etc.). Additionally, or alternatively, the first magnet 102 may include another type of magnet, such as an electromagnet, a magnetic tape, or the like. In some implementations, the first magnet 102 comprises a ferromagnetic material (e.g., hard ferrite). In some implementations, the first magnet 102 comprises a rare earth magnet which may be of advantage due to, for example, an intrinsically high magnetic field strength of rare earth magnets.

In some implementations, the first magnet 102 may be affixed or coupled to the trigger element 108 such that a position of the first magnet 102 corresponds to a position of the trigger element 108 on a linear trajectory. For example, as indicated in FIG. 1B, the trigger element 108 may be capable of moving along a linear trajectory (e.g., back and forth) along an x-direction. The first magnet 102 may be affixed or coupled to the trigger element 108 such that, as the trigger element 108 moves along the x-direction, the first magnet 102 also moves along an x-direction. As a result, a position of the first magnet 102 along the x-direction is reflective of the position of the trigger element 108 along the x-direction.

In some implementations, a magnetic field of the first magnet 102 influences a first magnetic field component and a second magnetic field component as the trigger element 108 moves along the linear trajectory. For example, the magnetic field of the first magnet 102 may influence a magnetic field component in the x-direction (herein referred to as an x-component of the magnetic field) and a magnetic field component in the z-direction (herein referred to as a z-component of the magnetic field). In some implementations, the magnetic sensor 106 may determine the position of the trigger element 108 based on the first magnetic field component (e.g., the x-component of the magnetic field) and the second magnetic field component (e.g., the z-component of the magnetic field).

In some implementations, the magnetic field of the first magnet 102 is confined to a first magnetic field component and the second magnetic field component as the trigger element 108 moves along the linear trajectory. That is, the magnetic field of the first magnet 102 may not significantly influence a third magnetic field component (e.g., a magnetic field component in the y-direction, herein referred to as a y-component of the magnetic field). In some implementations, confining the magnetic field of the first magnet 102 to the first magnetic field component and the second magnetic field component enables the magnetic sensor 106 to determine of a selected position of the selection element 110 using the third magnetic field component (e.g., the y-component of the magnetic field) as influenced by a magnetic field of the second magnet 104, as described herein.

The second magnet 104 is a magnet the influences a magnetic field in an environment of the magnetic sensor 106. In some implementations, the second magnet 104 includes two opposite poles on two portions of the second magnet 104 (e.g., a north pole on a first half of the second magnet 104, a south pole on a second half of the second magnet 104). For example, in some implementations, the second magnet 104 may include a dipole magnet. Additionally, or alternatively, the second magnet 104 may include another type of magnet, such as an electromagnet, a magnetic tape, or the like. In some implementations, the second magnet 104 comprises a ferromagnetic material. In some implementations, the second magnet 104 comprises a rare earth magnet which may be of advantage due to, for example, an intrinsically high magnetic field strength of rare earth magnets.

In some implementations, the second magnet 104 may be affixed or coupled to the selection element 110 such that a position of the second magnet 104 corresponds to a selected position of the selection element 110, with the selected position being one of a plurality of selectable positions. For example, as indicated in FIG. 1B, the selection element 110 may be capable of rotating about a z-direction such that the selection element 110 can be in a first selectable position P1 or a second selectable position P2. The second magnet 104 may be affixed or coupled to the selection element 110 such that, as the selection element 110 moves among different selectable positions, the second magnet 104 also moves among different positions. As a result, a position of the second magnet 104 is reflective of the selected position of the selection element 110. In some implementations, the plurality of selectable positions may include two or more selectable positions. In some implementations, the plurality of selectable positions may be arranged in an arc shape (e.g., as illustrated in FIGS. 1A and 1B). In some implementations, the plurality of selectable positions be arranged in a linear direction (e.g., a y-direction, a direction perpendicular to the direction in which the trigger element 108 moves). In some implementations, a magnetic field of the second magnet 104 influences the second magnetic field component and the third magnetic field component as the selection element 110 moves among selectable positions. For example, the magnetic field of the second magnet 104 may influence the z-component of the magnetic field and the y-component of the magnetic field. In some implementations, the magnetic sensor 106 may determine the selected position of the selection element 110 based on the third magnetic field component (e.g., the y-component of the magnetic field), as described herein.

In some implementations, the magnetic field of the second magnet 104 is confined to the second magnetic field component and the third magnetic field component as the selection element 110 moves among selectable positions. That is, the magnetic field of the second magnet 104 may not significantly influence the first magnetic field component (e.g., the x-component of the magnetic field). Further, the magnetic field of the second magnet 104 may have a constant effect on the first magnetic field component (e.g., the x-component of the magnetic field) and the second magnetic field component (e.g., the y-component of the magnetic field) at the magnetic sensor 106, irrespective of the selected position of the selection element 110. That is, regardless of the selected position of the selection element 110, the influence of the magnetic field of the second magnet 104 on the first magnetic field component and the second magnetic field component may be relatively constant. In some implementations, confining the magnetic field of the second magnet 104 to the second magnetic field component and the third magnetic field component, and arranging the second magnet 104 such that the effect on the first magnetic field component and the second component is relatively constant irrespective of the selected position of the selection element 110 enables the magnetic sensor 106 to determine of the position of the trigger element 108 using the first magnetic field component and the second magnetic field component (e.g., x- and z-components of the magnetic field, respectively) as influenced by a magnetic field of the first magnet 102, as described herein.

Magnetic sensor 106 is a magnetic sensor capable of determining the position of the trigger element 108 and/or the selected position of the selection element 110 based on strengths of one or more magnetic field components at the magnetic sensor 106. In some implementations, the magnetic sensor 106 includes one or more sensing elements, where each sensing element is capable of sensing a strength of a particular magnetic field component. For example, the magnetic sensor 106 may in some implementations be a 3D Hall sensor including one or more sensing elements capable of sensing a strength of the first magnetic field component (e.g., the x-component of the magnetic field), one or more sensing elements capable of sensing a strength of the second magnetic field component (e.g., the z-component of the magnetic field), and one or more sensing elements capable of sensing a strength of the third magnetic field component (e.g., the y-component of the magnetic field), with the first magnetic field component, the second magnetic field component, and the third magnetic field component being perpendicular to each other. Additional details regarding magnetic sensor 106 are provided below with respect to FIG. 5.

An example operation of the magnetic sensor 106 is described in FIG. 1A. As shown by reference number 112, the magnetic sensor 106 may detect the strength of the first magnetic field component (Bx), the strength of the second magnetic field component (Bz), and the strength of the third magnetic field component (By).

As shown by reference number 114, the magnetic sensor 106 may determine the position of the trigger element 108 based on the strength of the first magnetic field component and the strength of the second magnetic field component. For example, the magnetic sensor 106 may process a signal indicating the strength of the first magnetic field component and a signal indicating the strength of the second magnetic field component using an inverse tangent (arctan) function, a result of which provides a signal indicating the position of the trigger element 108 along the x-direction.

As shown by reference number 116, the magnetic sensor 106 may determine the selected position of the selection element 110 based on the strength of the third magnetic field component. For example, a signal indicating the strength of the third magnetic field component may have a first value when the selection element 110 is in the first selectable position P1, and may have a second value when the selection element 110 is in the second selectable position P2. Therefore, the magnetic sensor 106 may use the value of the signal to identify the selected position of the selection element 110.

In some implementations, a symmetric design and arrangement of the second magnet 104 results in no significant influence of the second magnet 104 on the determination of the position of the trigger element 108, regardless of whether the selection element 110 is in the selectable position P1 or the selectable position P2. However, even in the case of an asymmetric system (e.g., a system in which an influence of the second magnet 104 on the second magnetic field component is not constant across the selectable positions of the selection element 110), reliable determination of the position of the trigger element 108 is possible. For example, the magnetic sensor 106 may determine the selected position of the selection element 110 (i.e., the position of the second magnet 104) based on the third magnetic field component. Next, with knowledge of the position of the second magnet 104, the magnetic sensor 106 could apply a correction to the second magnetic field component, with the correction being based on the position of the second magnet 104. The magnetic sensor 106 may then determine the position of the trigger element 108 based on the first magnetic field component and the (corrected) second magnetic field component.

In this way, the contactless magnetic sensing trigger system 100 enables contactless detection of the position of the trigger element 108 and the selected position of the selection element 110. As a result, the contactless magnetic sensing trigger system 100 overcomes the disadvantages of a resistive potentiometer measurement system, thereby improving reliability and performance in association with controlling the device (e.g., the power tool).

As indicated above, FIGS. 1A and 1B are provided as examples. Other examples may differ from what is described with regard to FIGS. 1A and 1B. The number and arrangement of elements shown in FIGS. 1A and 1B are provided as an example. In practice, there may be additional elements, fewer elements, different elements, or differently arranged elements than those shown in FIGS. 1A and 1B. Furthermore, two or more elements shown in FIGS. 1A and 1B may be implemented within a single element, or a single element shown in FIGS. 1A and 1B may be implemented as multiple, distributed elements.

Figure 2A:
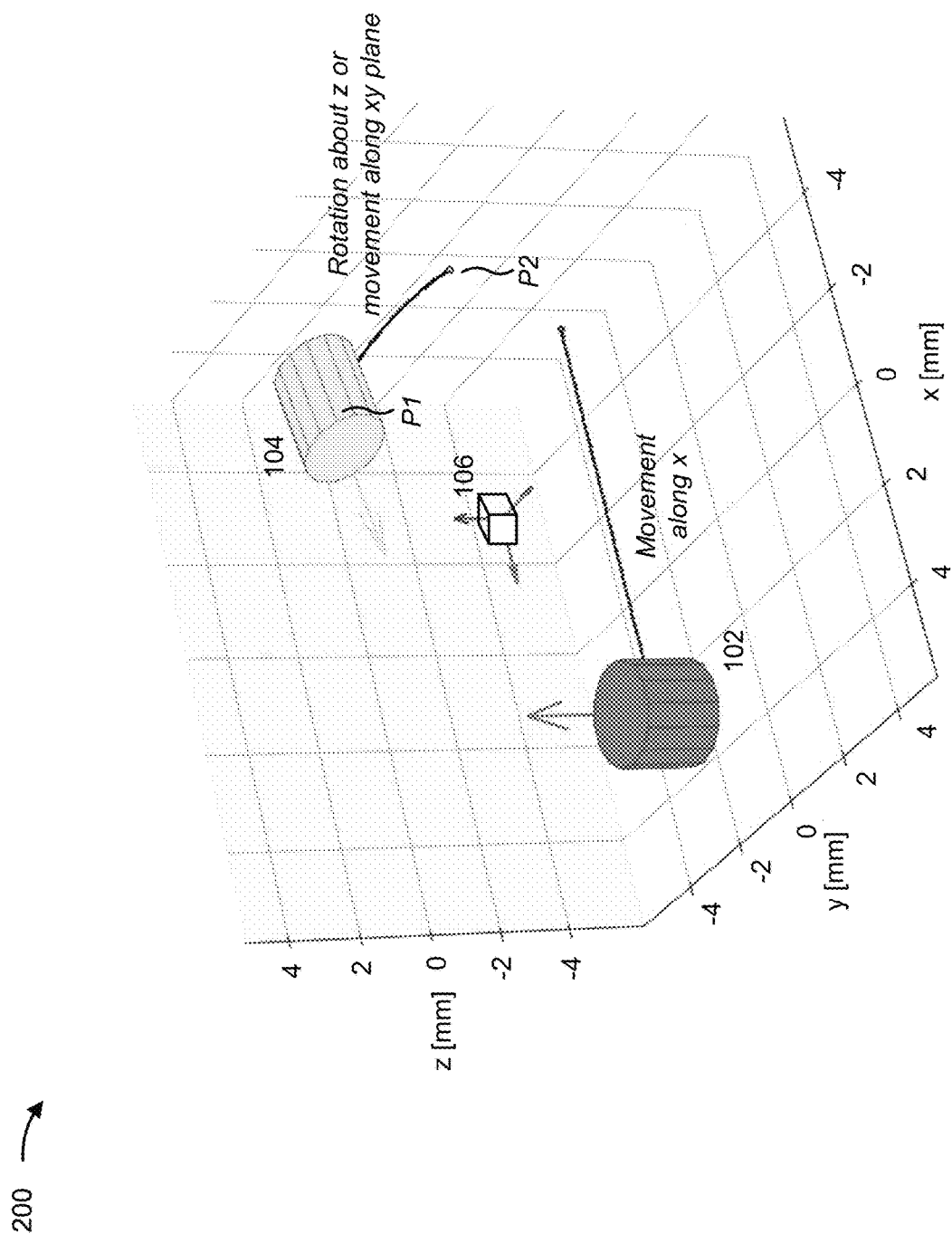
FIGS. 2A-2C are diagrams associated with an example implementation of the contactless magnetic sensing trigger system described with respect to FIG. 1A.
Figure 2B:
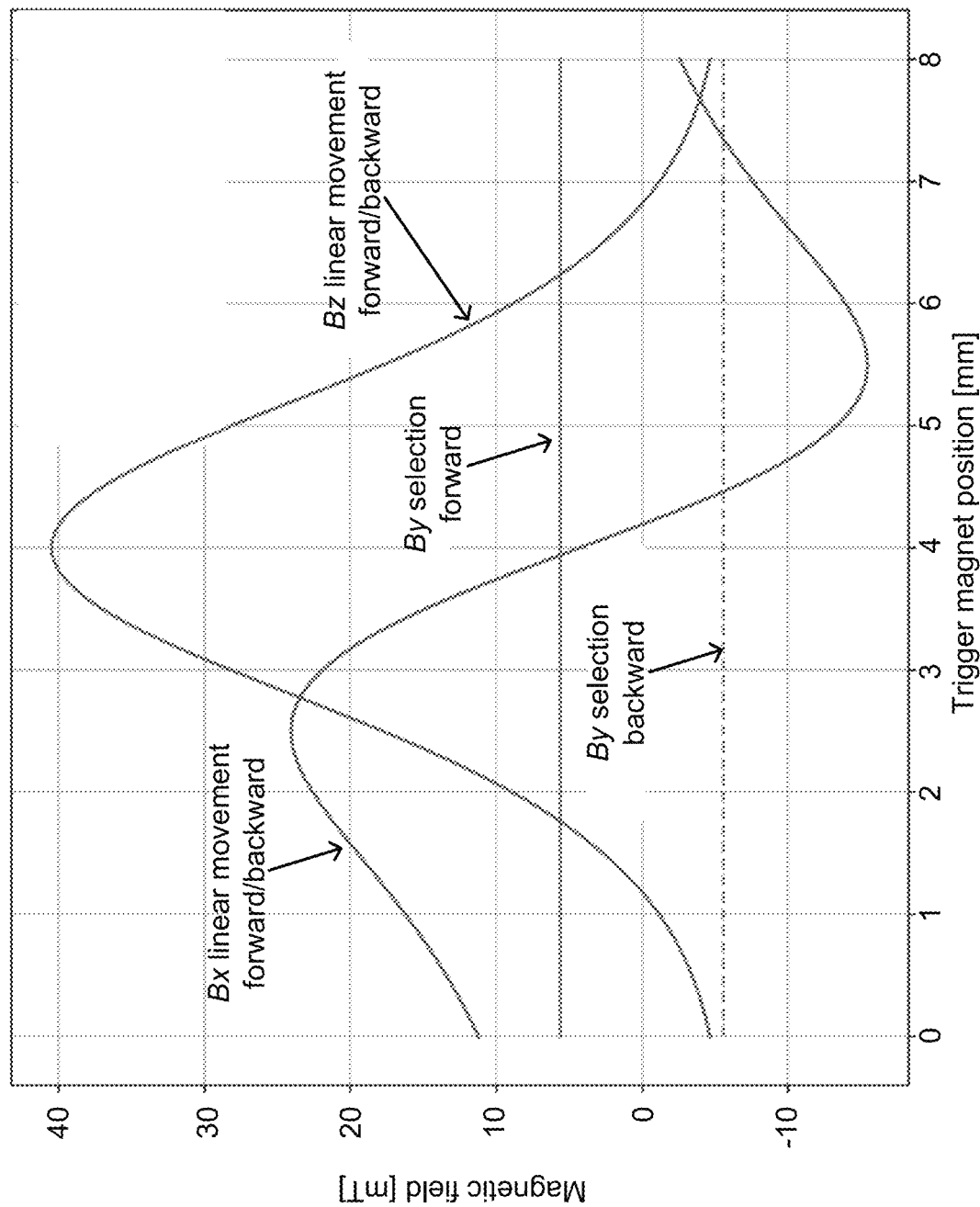
Figure 2C:
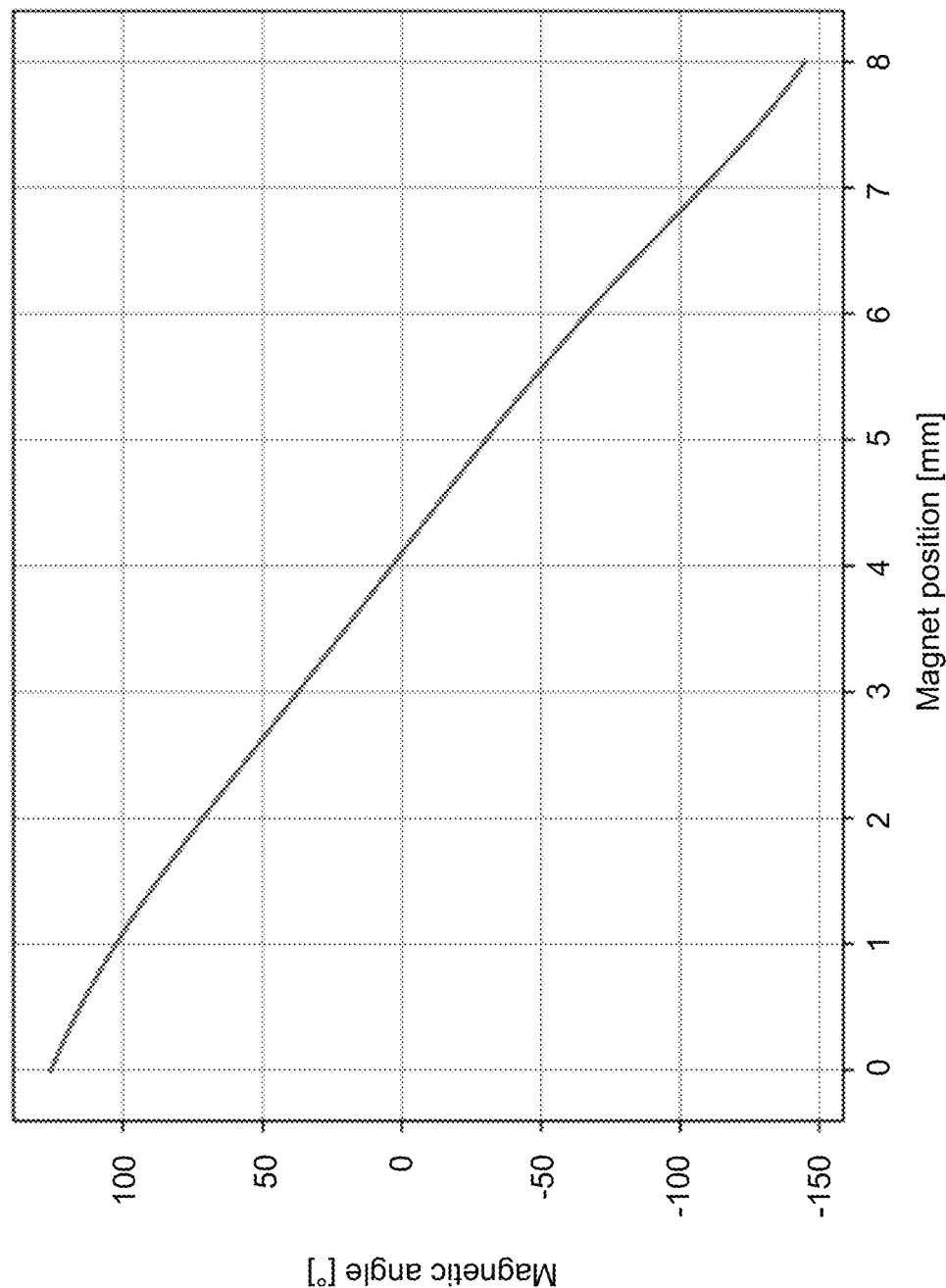

FIGS. 2A-2C are diagrams associated with an example implementation 200 of the contactless magnetic sensing trigger system 100. In FIG. 2A, the first magnet 102 can be moved along a linear trajectory +4 millimeters (mm) to −4 mm in an x-direction, and the second magnet 104 can be moved from +13 degrees)(° to −13° in a y-direction. The magnetic sensor 106 includes a 3D Hall sensor. The magnetic sensor 106 is arranged at a central position (x=0 mm, y=0 mm, z=0 mm), the first magnet 102 is arranged at a first position (x=−4 mm, y=0 mm, z=−3 mm), and the second magnet 104 is arranged at a second position (x=4 mm, y=0 mm, z=2 mm).

FIG. 2B is a diagram illustrating signals corresponding to strengths of the magnetic field components (Bx, By, Bz), at the magnetic sensor 106 as the first magnet 102 and the second magnet 104 move in the environment of the magnetic sensor 106. Here, the signals are generated by moving the first magnet 102 from 4 mm to −4 mm in the x-direction (8 mm total), as well as moving the second magnet 104 from −13° to +13° (26° total) about a z-direction and along an x-y plane. Here, the "By selection forward" and "By selection backward" signals illustrate that the position of the second magnet 104 (and therefore the selected position of the selection element 110) can be readily determined without influences generated by the first magnet 102.

Notably, the Bx signal (i.e., the signal indicating the strength of the x-component of the magnetic field) and the Bz signal (i.e., the signal indicating the strength of the z-component of the magnetic field) are identical for movement of the trigger element 108 in the forward and backward directions. Determination of the position of the first magnet 102 (and therefore the position of the trigger element 108) can be performed using the arctan function. For example, a value of the Bx signal and a value of the Bz signal can be used to determine a magnetic angle (e.g., an angle of the first magnet 102 with respect to the magnetic sensor 106). Here, as shown in FIG. 2C, the magnetic angle of the first magnet 102 can be translated to a position of the first magnet 102 (e.g., due to a near linear relationship between magnetic angle and position of the first magnet 102). Thus, the arctan function can be readily used to determine the position of the trigger element 108.

As indicated above, FIGS. 2A-2C are provided as an example. Other examples may differ from what is described with regard to FIGS. 2A-2C.

Figure 3:
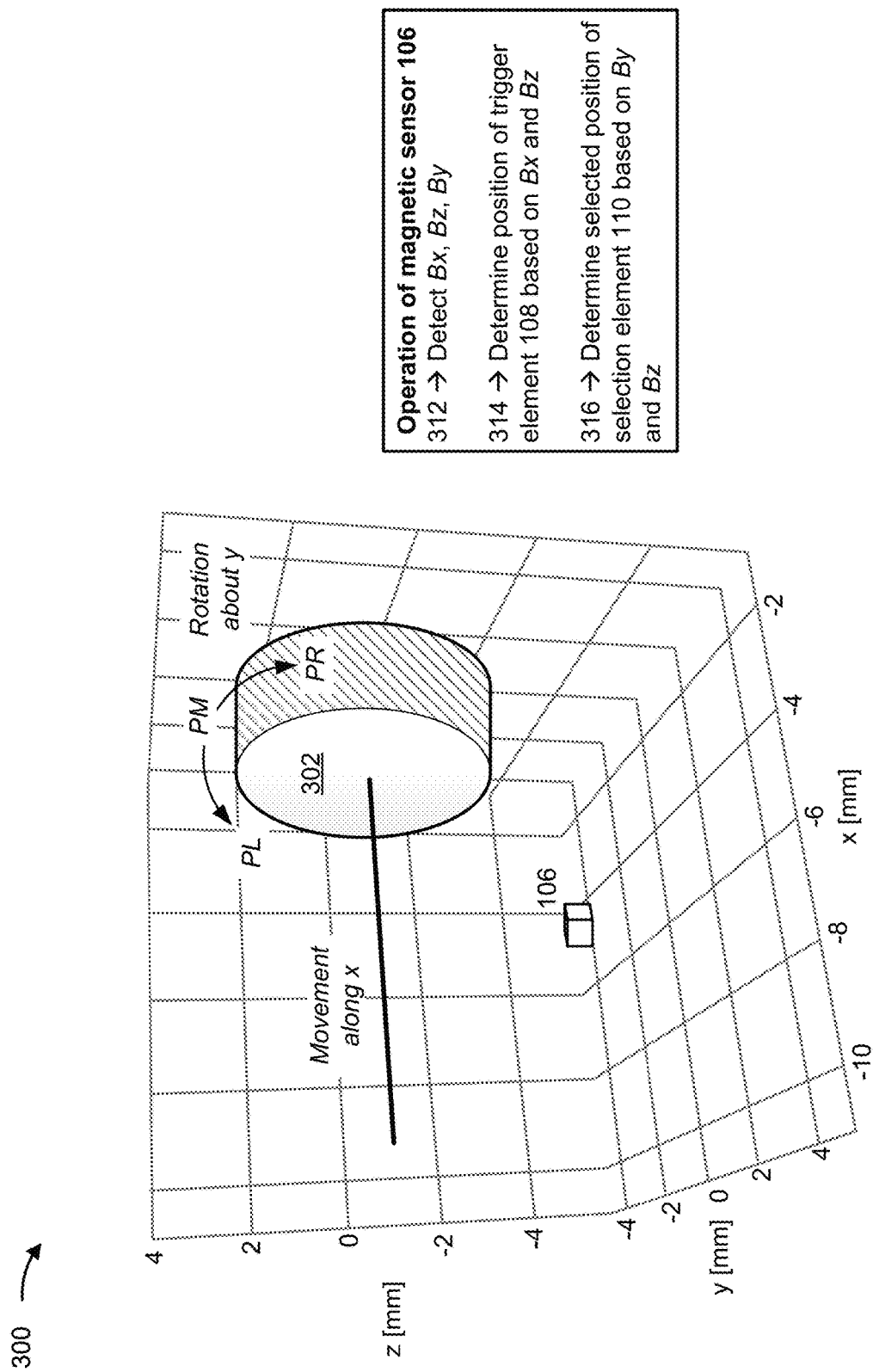
FIG. 3 is a diagram illustrating another example associated with a contactless magnetic sensing trigger system described herein.

FIG. 3 is a diagram illustrating an example associated with a contactless magnetic sensing trigger system 300. As shown in FIG. 3, the contactless magnetic sensing trigger system 300 includes a magnet 302, a magnetic sensor 106. The contactless magnetic sensing trigger system 300 further includes a trigger element 108 and a selection element 110 as shown in and described with respect to FIG. 1B. In some implementations, the contactless magnetic sensing trigger system 300 may be included in a power tool, such as a power drill.

The magnet 302 is a magnet the influences a magnetic field in an environment of the magnetic sensor 106. In some implementations, the magnet 302 includes two opposite poles on two portions of the magnet 302 (e.g., a north pole on a first half of the magnet 302, a south pole on a second half of the magnet 302). For example, in some implementations, the magnet 302 may include a dipole magnet (e.g., a dipole bar magnet, a circular dipole magnet, an elliptical dipole magnet, etc.). Additionally, or alternatively, the magnet 302 may include another type of magnet, such as an electromagnet, a magnetic tape, or the like. In some implementations, the magnet 302 comprises a ferromagnetic material (e.g., hard ferrite). In some implementations, the magnet 302 comprises a rare earth magnet which may be of advantage due to, for example, an intrinsically high magnetic field strength of rare earth magnets. In some implementations, the magnet 302 may be, for example, a circular magnet, a ring magnet, or a cubic magnet, among other examples.

In some implementations, the magnet 302 may be affixed or coupled to the trigger element 108 such that a linear position of the magnet 302 corresponds to a position of the trigger element 108 on a linear trajectory. For example, as indicated in FIG. 1B, the trigger element 108 may be capable of moving along a linear trajectory (e.g., back and forth) along an x-direction. The magnet 302 may be affixed or coupled to the trigger element 108 such that, as the trigger element 108 moves along the x-direction, the magnet 302 also moves along an x-direction. As a result, a position of the magnet 302 along the x-direction is reflective of the position of the trigger element 108 along the x-direction. In some implementations, the magnet 302 is arranged to be rotatable about the linear trajectory along which the magnet 302 is moveable. For example, the magnet 302 may be moveable along an x-direction, as shown in FIG. 3. Here, the magnet 302 may be rotatable about an axis corresponding to the x-direction along which the magnet 302 is moveable.

In some implementations, a magnetic field of the magnet 302 influences a first magnetic field component and a second magnetic field component as the trigger element 108 moves along the linear trajectory. For example, the magnetic field of the magnet 302 may influence a magnetic field component in the x-direction (herein referred to as an x-component of the magnetic field) and a magnetic field component in the z-direction (herein referred to as a z-component of the magnetic field). In some implementations, the magnetic sensor 106 may determine the position of the trigger element 108 based on the first magnetic field component (e.g., the x-component of the magnetic field) and the second magnetic field component (e.g., the z-component of the magnetic field).

Further, the magnet 302 may in some implementations be affixed or coupled to the selection element 110 such that an angular position of the magnet 302 corresponds to a selected position of the selection element 110, with the selected position being one of a plurality of selectable positions. For example, as indicated in FIG. 1B, the selection element 110 may be capable of rotating about a z-direction such that the selection element 110 can be in one of a plurality of selectable positions. As indicated in FIG. 3, the magnet 302 may be affixed or coupled to the selection element 110 such that, as the selection element 110 moves among different selectable positions, the magnet 302 rotates about a y-direction so as to move among different angular positions. As a result, an angular position of the magnet 302 is reflective of the selected position of the selection element 110. In some implementations, the plurality of selectable positions may include two or more selectable positions. For example, the plurality of selectable positions may include a left position PL, a middle position PM, and a right position PR, each of which has a corresponds to a different angular position of the magnet 302, as indicated in FIG. 3. In some implementations, the magnetic field of the magnet 302 influences the second magnetic field component and the third magnetic field component as the selection element 110 moves among selectable positions. For example, the magnetic field of the magnet 302 may influence the z-component of the magnetic field and the y-component of the magnetic field. In some implementations, the magnetic sensor 106 may determine the selected position of the selection element 110 based on the third magnetic field component (e.g., the y-component of the magnetic field) and the second magnetic field component (e.g., the z-component), as described herein. Additionally, or alternatively, the magnetic sensor 106 may in some implementations determine the selected position of the selection element 110 based on the third magnetic field component only (e.g., the y-component), as described herein.

Magnetic sensor 106 is a magnetic sensor capable of determining the position of the trigger element 108 and/or the selected position of the selection element 110 based on strengths of one or more magnetic field components at the magnetic sensor 106, as described above with respect to FIGS. 1A and 1B.

An example operation of the magnetic sensor 106 is described in FIG. 3. As shown by reference number 312, the magnetic sensor 106 may detect the strength of the first magnetic field component (Bx), the strength of the second magnetic field component (Bz), and the strength of the third magnetic field component (By).

As shown by reference number 314, the magnetic sensor 106 may determine the position of the trigger element 108 based on the strength of the first magnetic field component and the strength of the second magnetic field component. For example, the magnetic sensor 106 may process a signal indicating the strength of the first magnetic field component and a signal indicating the strength of the second magnetic field component using an inverse tangent (arctan) function, a result of which provides a signal indicating the linear position of the trigger element 108 along the x-direction.

As shown by reference number 316, the magnetic sensor 106 may determine the selected position of the selection element 110 based on the strength of the third magnetic field component and the strength of the second magnetic field component. For example, a signal indicating the strength of the third magnetic field component and a signal indicating the strength of the second magnetic field component using an inverse tangent (arctan) function, a result of which provides a signal indicating an angle of the magnet 302 with respect to the magnetic sensor 106. Here, the angular position of the magnet may be at or below a first value (e.g., −10°) when the selection element 110 is in a first selectable position (e.g., position PL), may be between the first value and a second value (e.g., 10°) when the selection element is in a second selectable position (e.g., position PM), and may be at or above the second value when the selection element 110 is in a third selectable position (e.g., position PR). Therefore, the magnetic sensor 106 may use the value of the signal to identify the selected position of the selection element 110.

Notably, the contactless magnetic sensing trigger system 300 comprises a single magnet 302 (e.g., rather than a first magnet 102 and a second magnet 104, as in the case of the contactless magnetic sensing trigger system 100). As a result, cost and complexity of configuration of the contactless magnetic sensing trigger system 300 may be reduced.

In this way, the contactless magnetic sensing trigger system 300 enables contactless detection of the position of the trigger element 108 and the selected position of the selection element 110. As a result, the contactless magnetic sensing trigger system 300 overcomes the disadvantages of a resistive potentiometer measurement system, thereby improving reliability and performance in association with controlling the device (e.g., the power tool).

As indicated above, FIG. 3 is provided as an example. Other examples may differ from what is described with regard to FIG. 3. The number and arrangement of elements shown in FIG. 3 are provided as an example. In practice, there may be additional elements, fewer elements, different elements, or differently arranged elements than those shown in FIG. 3. Furthermore, two or more elements shown in FIG.

3 may be implemented within a single element, or a single element shown in FIG. 3 may be implemented as multiple, distributed elements.

FIGS. 4A-4G are diagrams associated with an example implementation of the contactless magnetic sensing trigger system 300. In this example implementation, with reference to FIG. 3, the magnet 302 is a 4 mm×1 mm disc magnet that can be moved along a linear trajectory −10 mm to −2 mm in an x-direction along with linear movement a trigger element 108, and can be rotated moved from +15° to −15° about y-direction along with rotation caused by movement of a selection element 110. The selection element 110 can be in one of three selectable positions: a position PL, a position PM, and a position PR. The magnetic sensor 106 includes a 3D Hall sensor and is arranged at a central position (x=0 mm, y=−6 mm, z=−4 mm).

Figure 4A:
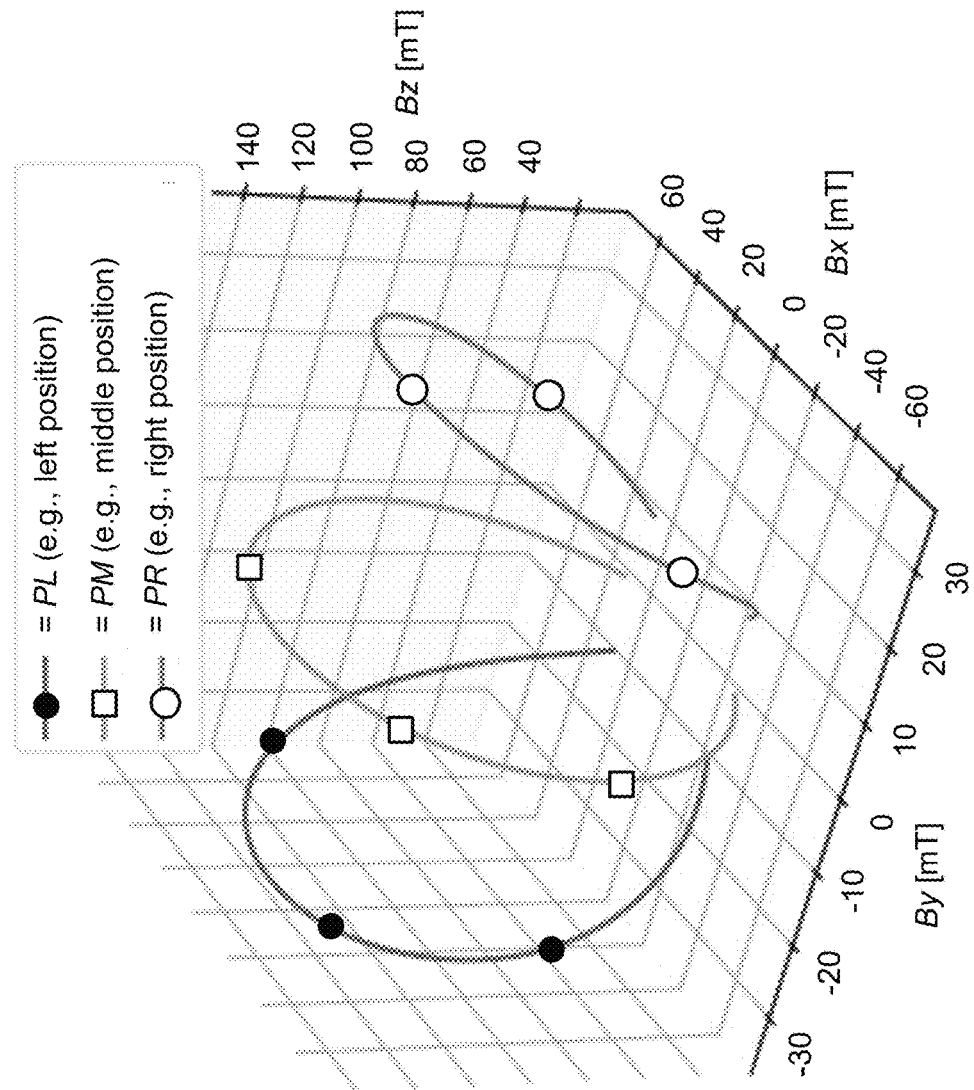
FIGS. 4A-4G are diagrams associated with an example implementation of the contactless magnetic sensing trigger system described with respect to FIG. 3.

FIG. 4A is a diagram illustrating an example of 3D raw magnetic field signals (Bx, By, Bz) for each of the selected positions of the selection element over the range of linear movement.

Figure 4B:
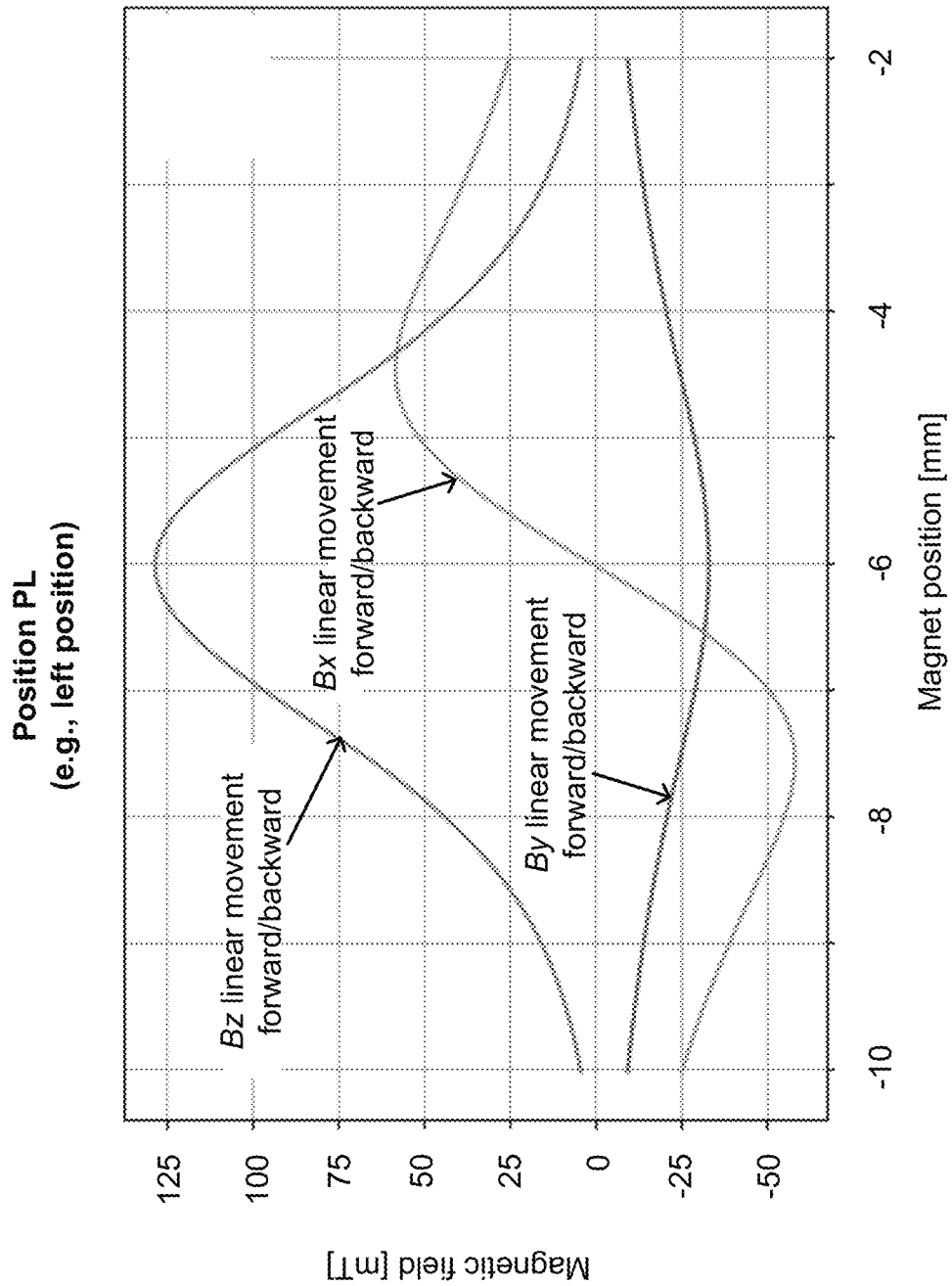

FIG. 4B is a diagram illustrating an example of signals corresponding to strengths of the magnetic field components at the magnetic sensor 106 as the magnet 302 moves in the environment of the magnetic sensor 106 while the selection element 110 is in the position PL (e.g., such that the magnet 302 is rotated to a position of)−15°. Here, the signals are generated by moving the first magnet 102 from −10 mm to −2 mm in the x-direction (8 mm total) while the magnet 302 is in the position PL.

Figure 4C:
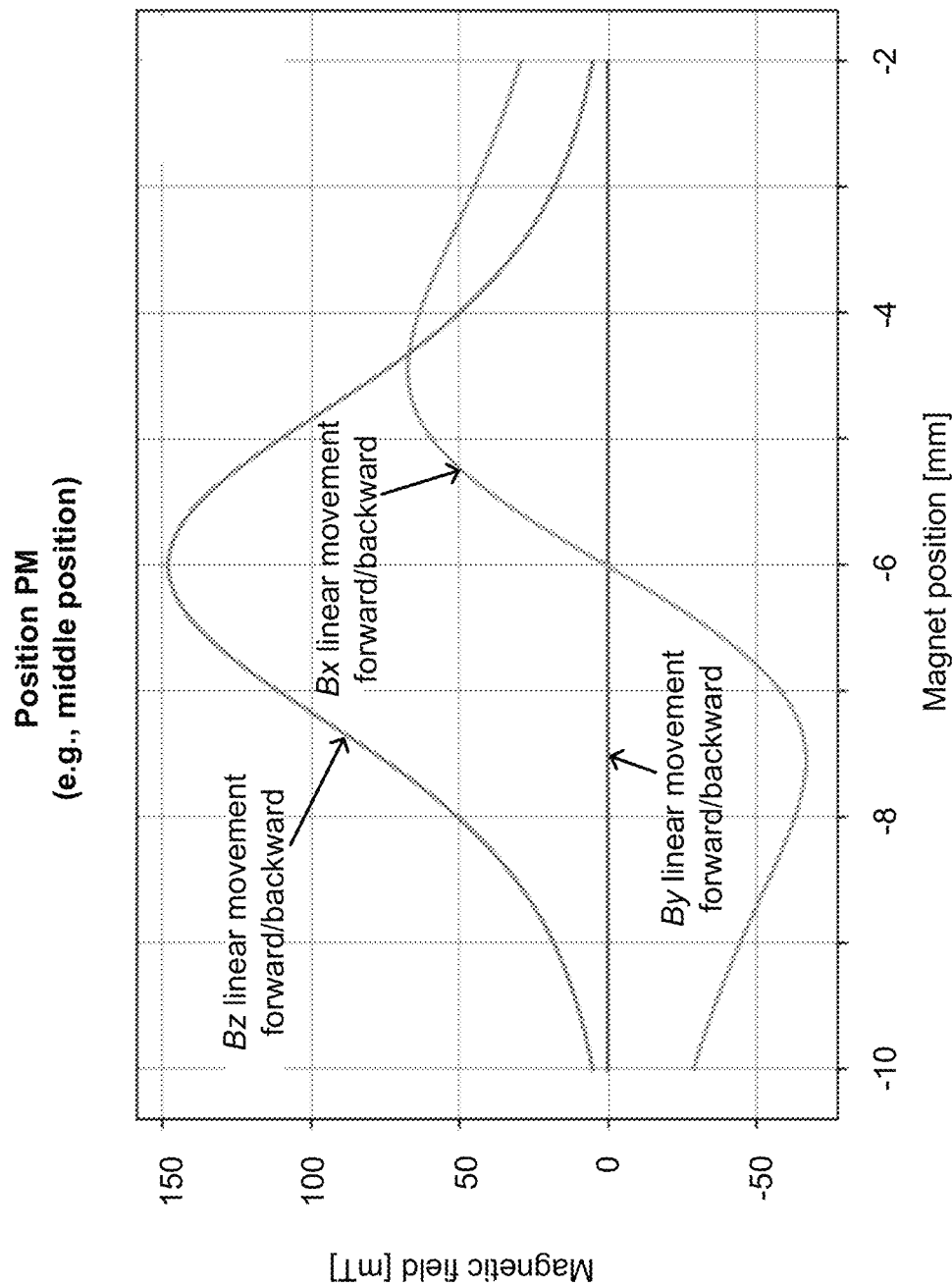

FIG. 4C is a diagram illustrating an example of signals corresponding to strengths of the magnetic field components at the magnetic sensor 106 as the magnet 302 moves in the environment of the magnetic sensor 106 while the selection element 110 is in the position PM (e.g., such that the magnet 302 is rotated to a position of 0°). Here, the signals are generated by moving the first magnet 102 from −10 mm to −2 mm in the x-direction (8 mm total) while the magnet 302 is in the position PM.

Figure 4D:
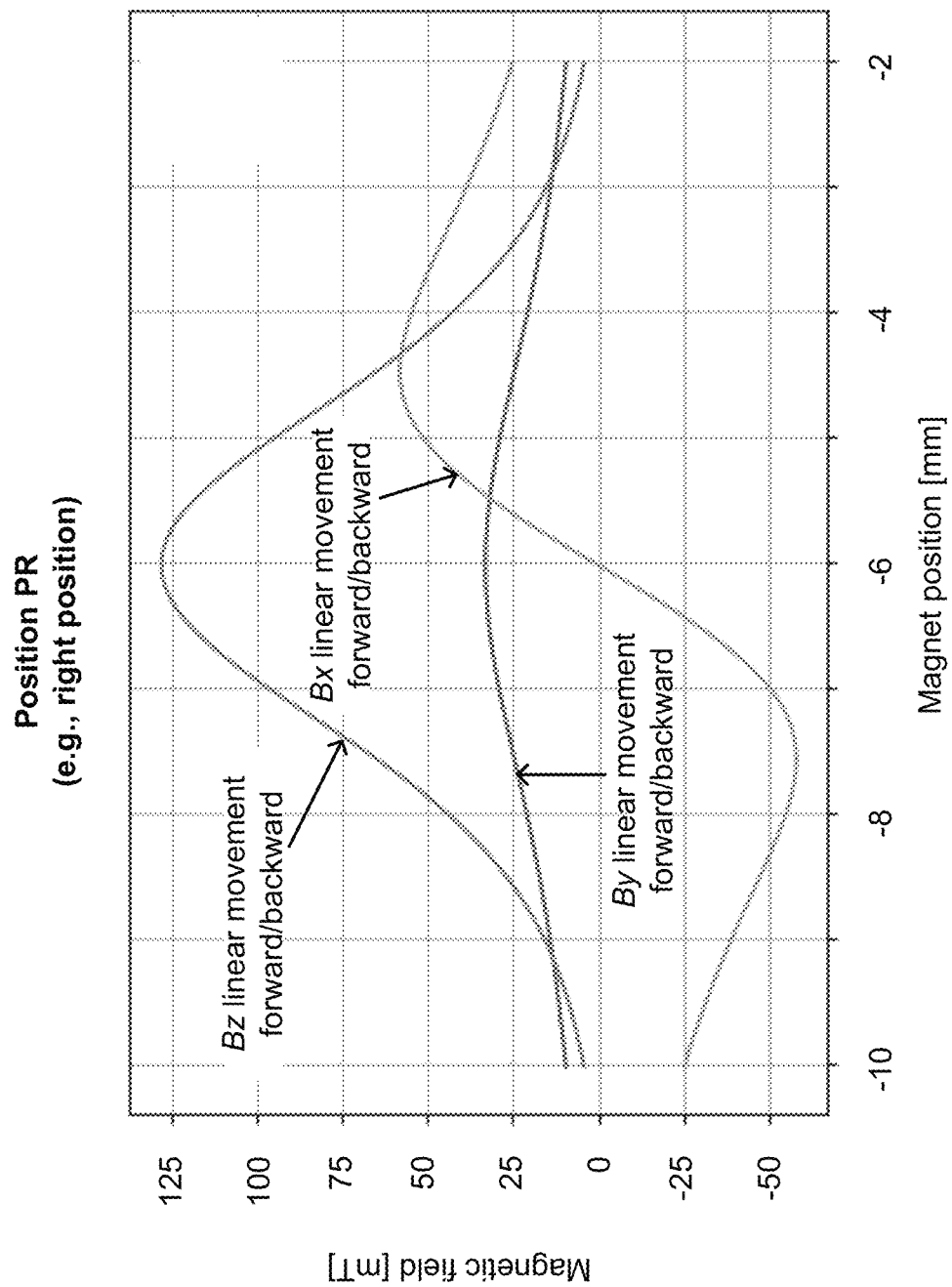

FIG. 4D is a diagram illustrating an example of signals corresponding to strengths of the magnetic field components at the magnetic sensor 106 as the magnet 302 moves in the environment of the magnetic sensor 106 while the selection element 110 is in the position PR (e.g., such that the magnet 302 is rotated to a position of 15°). Here, the signals are generated by moving the first magnet 102 from −10 mm to −2 mm in the x-direction (8 mm total) while the magnet 302 is in the position PR.

Here, determination of the linear position of the magnet 302 (and therefore the position of the trigger element 108) can be performed by applying the arctan function to the Bx signal (i.e., the signal indicating the strength of the x-component of the magnetic field) and the Bz signal (i.e., the signal indicating the strength of the z-component of the magnetic field). For example, a value of the Bx signal and a value of the Bz signal can be used to determine an angle of the magnet 302 with respect to the magnetic sensor 106. The angle of the magnet 302 with respect to the magnetic sensor 106 can be translated to a position of the magnet 302 (e.g., due to a near linear relationship between magnetic angle and position of the magnet 302). Thus, the arctan function can be readily used to determine the position of the trigger element 108.

Figure 4E:
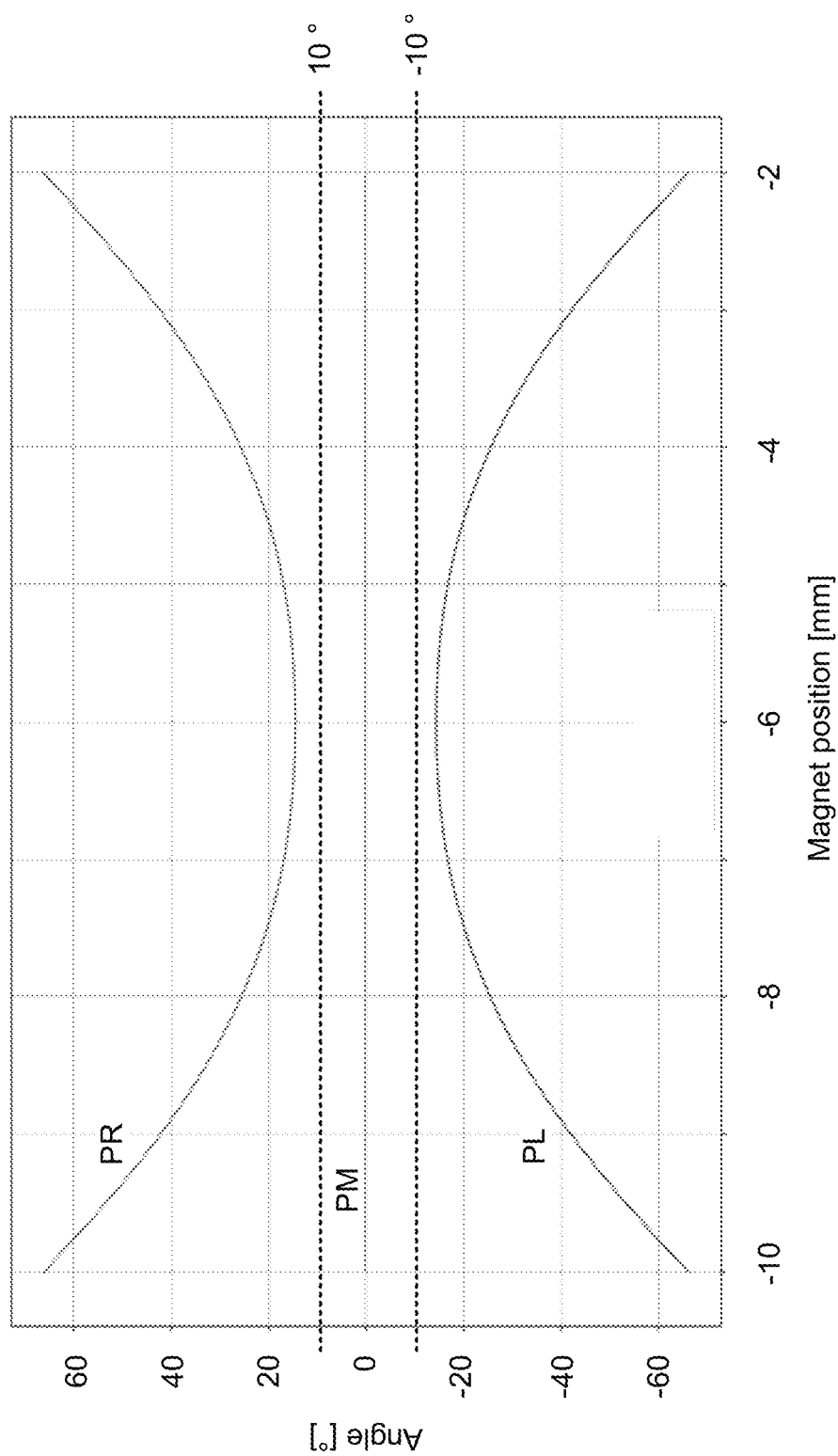

Further, determination of the angular position of the magnet 302 (and therefore the selectable position of the selection element 110) can be performed by applying the arctan function to the By signal (i.e., the signal indicating the strength of the y-component of the magnetic field) and the Bz signal. For example, a value of the By signal and a value of the Bz signal can be used to determine angular position of the magnet 302 (with respect to rotation about an axis of linear movement of the magnet 302). Here, as shown in FIG. 4E, the angular position of the magnet 302 may be at or below a first value (e.g., −10°) when the selection element 110 is in a first selectable position (e.g., position PL), may be between the first value and a second value (e.g., 10°) when the selection element is in a second selectable position (e.g., position PM), and may be at or above the second value when the selection element 110 is in a third selectable position (e.g., position PR). Therefore, the magnetic sensor 106 may use the value of the signal indicating the angular position of the magnet 302 to identify the selected position of the selection element 110.

Additionally, or alternatively, the determination of the angular position of the magnet 302 (and therefore the selectable position of the selection element 11) can in some implementations be performed based on a value of the By signal. For example, a value of the By signal can be used to roughly determine the angular position of the magnet 302 (with respect to rotation about an axis of linear movement of the magnet 302). As one particular example, and with reference to FIGS. 4B-4D, the value of the By signal may be at or below a first value (e.g., −5 milliTeslas (mT)) when the selection element 110 is in the first selectable position, may be between the first value and a second value (e.g., 5 mT) when the selection element 110 is in the second selectable position, and may be at or above the second value when the selection element 110 is in the third selectable position. The particular signal value thresholds in a given application depend on the properties of the magnet 302. Here, the magnetic sensor 106 may use the value of the By signal to identify the selected position of the selection element 110. Notably, in such a scenario, the magnetic sensor 106 need not compute the actual angular position of the magnet 302, thereby reducing processing time and resource usage in association with determining the selected position of the selection element 110.

Figure 4F:
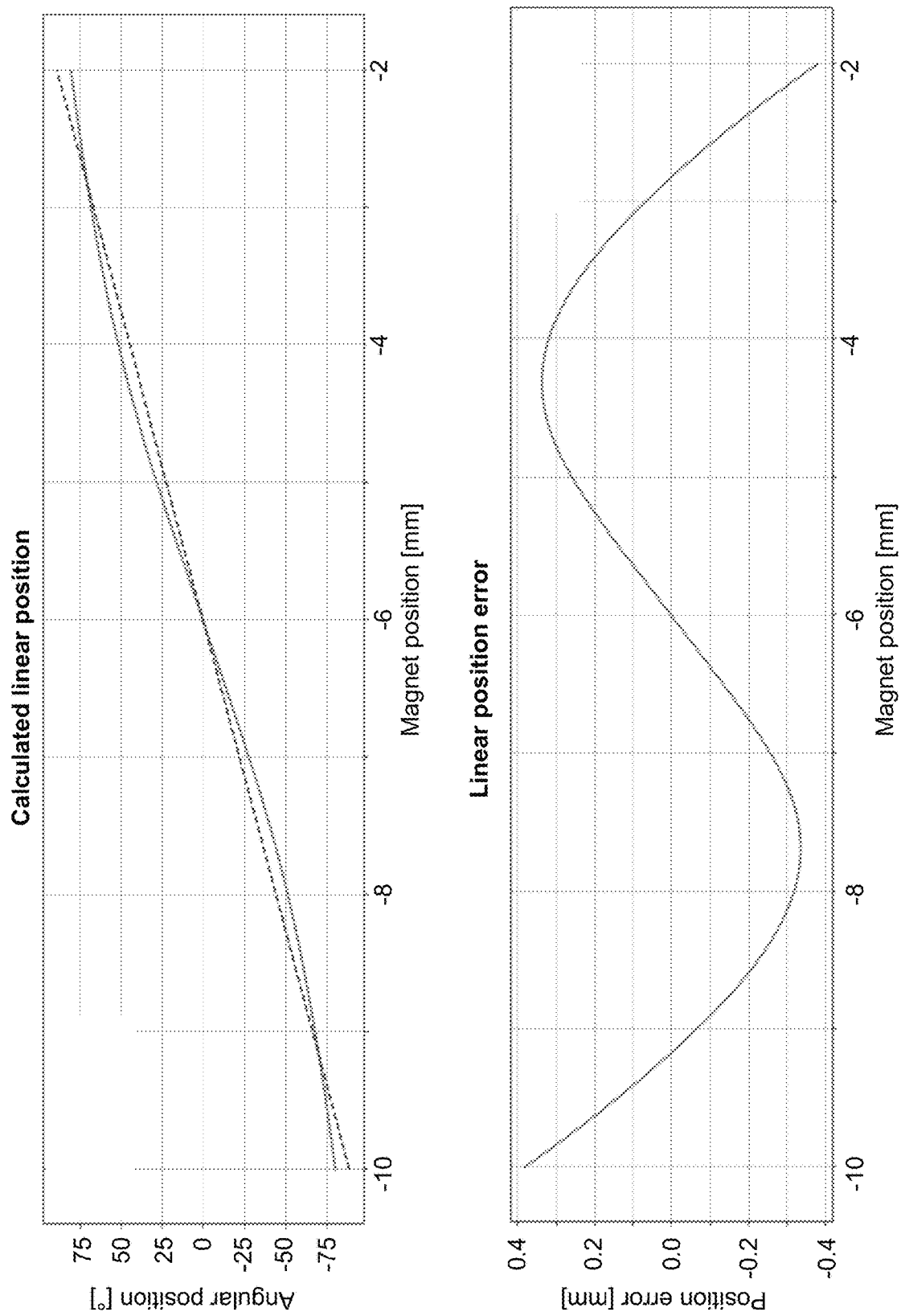

FIG. 4F includes diagrams illustrating an example associated with linear position calculation and the presence of linear position error in the contactless magnetic sensing trigger system 300. In the upper diagram of FIG. 4, the solid line represents calculated angular position over the range of linear movement of the magnet 302 while the selection element 110 is in the position PR (e.g., such that the magnet 302 is rotated to a position of 15°). As shown in the upper diagram of FIG. 4F, the calculated angular position is somewhat non-linear over the range of linear movement of the magnet 302. Therefore, as shown in the lower diagram of FIG. 4F, there may in some implementations be an error present in the linear position as determined by the magnetic sensor 106 over the range of linear movement of the magnet 302. In some implementations, the error may be negligible and may therefore be ignored. Alternatively, the error in the linear position may be mitigated through use of a polynomial fit of the transfer function, an example of which is shown by the dashed line in the upper diagram of FIG. 4F.

Figure 4G:
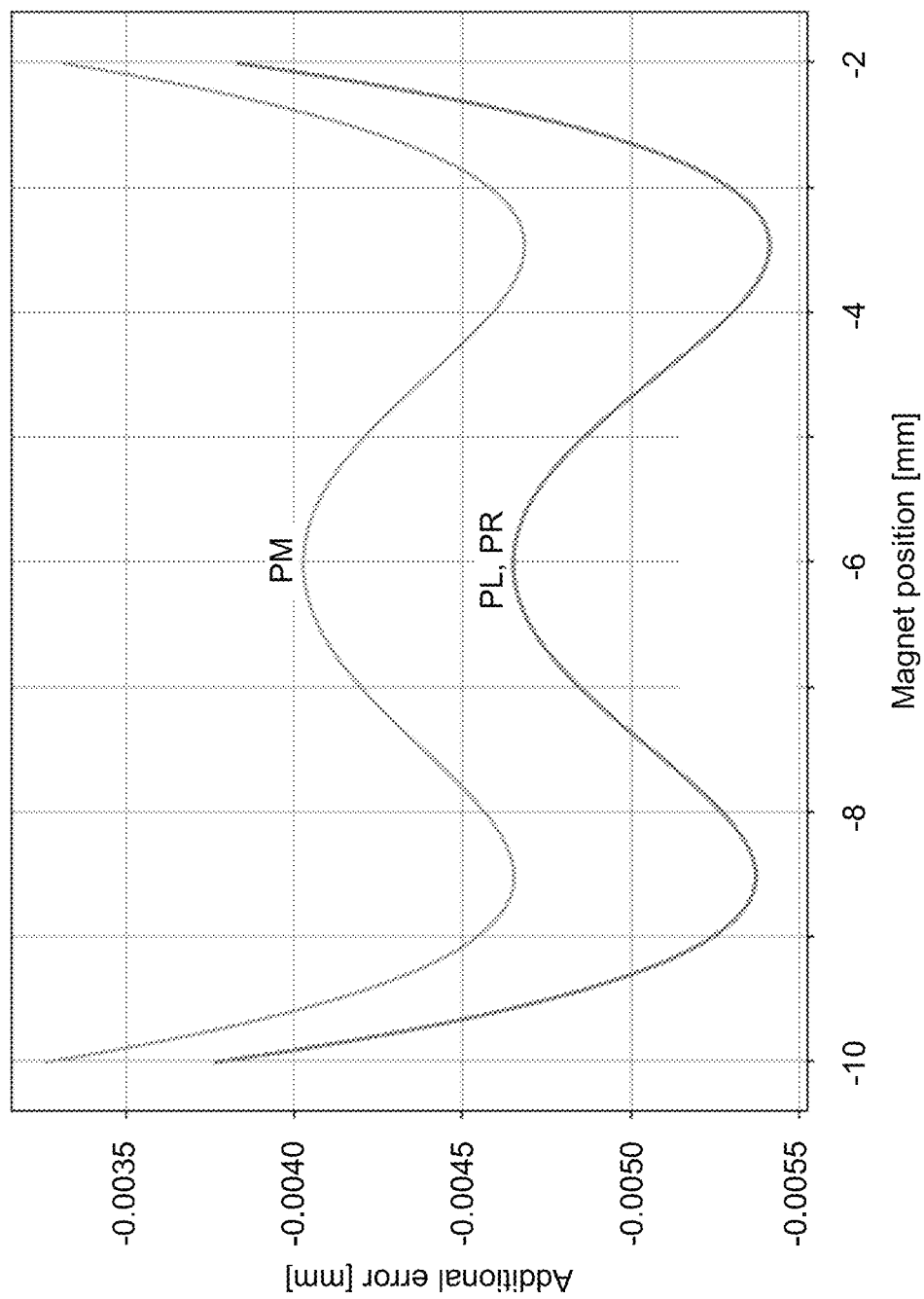

FIG. 4G is a diagram illustrating stray field robustness of the contactless magnetic sensing trigger system 300. In some implementations, a stray magnetic field may be present near the contactless magnetic sensing trigger system 300. For example, in the case of a power tool, power wires (e.g., from a battery to a motor) may produce a stray magnetic field near the contactless magnetic sensing trigger system 300, and such a stray field may influence accuracy of the magnetic sensor 106. However, the contactless magnetic sensing trigger system 300 may be relatively robust to stray fields. FIG. 4G is a diagram illustrating an example of error in the linear position as determined by the magnetic sensor 106 over the range of linear movement of the magnet 302. In this example, a stray magnetic field generated by 20 ampere (A) power wires near (e.g., within approximately 10 mm of) the magnetic sensor 106 was applied. As indicated in FIG. 4G, the stray magnetic field has a negligible impact on performance of the magnetic sensor 106 (e.g., a maximum of approximately 0.0055 mm of error was introduced, regardless of an angular position of the magnet 302).

As indicated above, FIGS. 4A-4G are provided as an example. Other examples may differ from what is described with regard to FIGS. 4A-4G.

Figure 5:
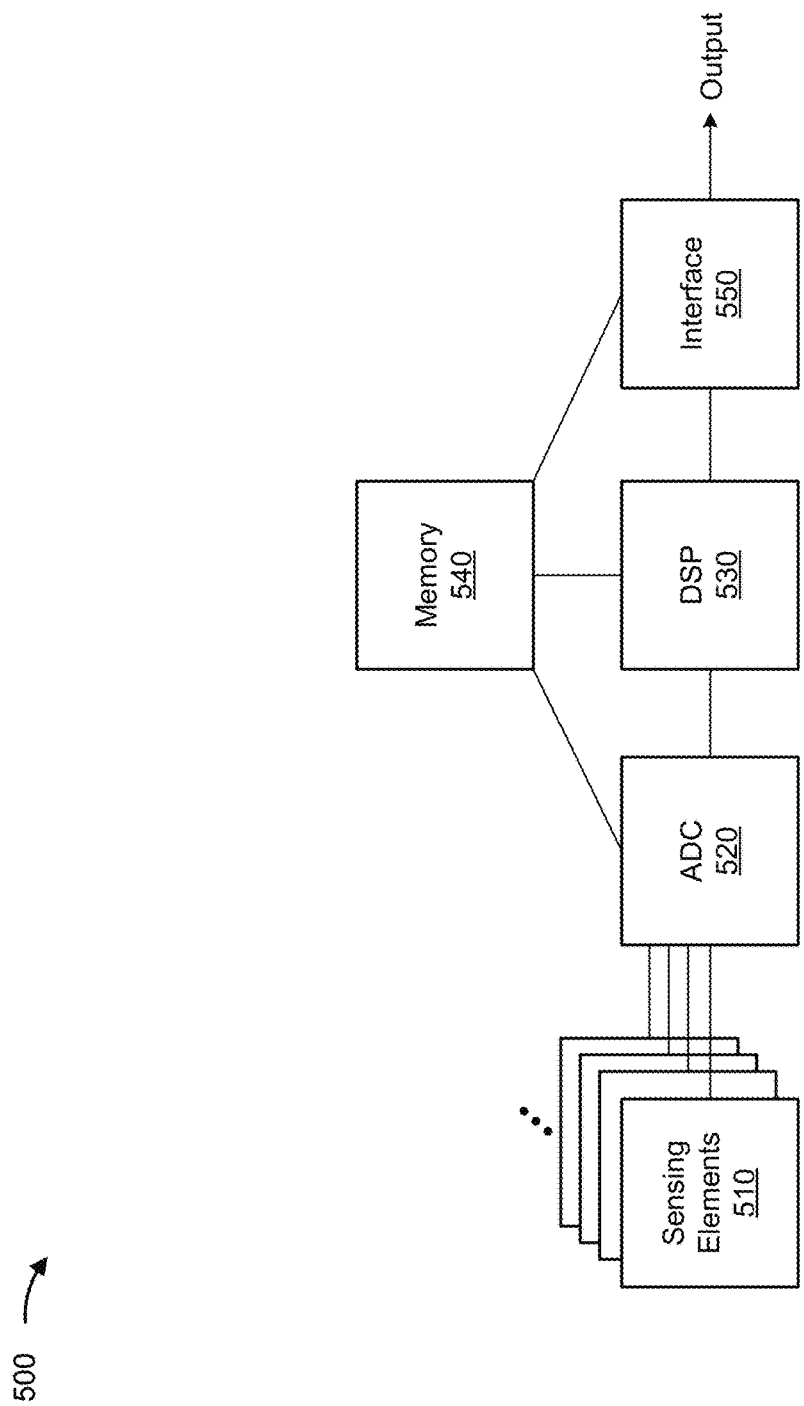
FIG. 5 is a diagram of example elements of the magnetic sensor in the contactless magnetic sensing trigger system described herein.

FIG. 5 is a diagram of example elements 500 of magnetic sensor 106 in in the contactless magnetic sensing trigger system 100 or the contactless magnetic sensing trigger system 300. As shown in FIG. 5, magnetic sensor 106 may include a set of sensing elements 510, an analog-to-digital convertor (ADC) 520, a digital signal processor (DSP) 530, a memory element 540, and an interface 550.

Sensing element 510 may include an element for sensing a physical property (e.g., a magnetic field, a temperature, a pressure, or an acceleration, among other examples) in an environment of sensing element 510, and providing a signal corresponding to the sensed physical property. For example, sensing element 510 may include an element for sensing one or more components of a magnetic field present at the magnetic sensor 106 (e.g., a magnetic field generated by a magnet) and providing a signal corresponding to a strength of the sensed component of the magnetic field. In one particular example, sensing element 510 may include a Hall-based sensing element that operates based on a Hall effect. In some implementations, the magnetic sensor 106 includes multiple Hall-based sensing elements that are sensitive in different directions. For example, the magnetic sensor 106 may include a first Hall-based sensing element configured to sense a first magnetic field component (e.g., an x-component), a second Hall-based sensing element configured to sense a second magnetic field component (e.g., a z-component), and a third Hall-based sensing element configured to sense a third magnetic field component (e.g., a y-component). That is, in some implementations, the magnetic sensor 106 may be a 5D Hall sensor.

In another particular example, sensing element 510 may include a magnetoresistive (MR)-based sensing element, elements of which are comprised of a magnetoresistive material (e.g., nickel-iron (NiFe)), where the electrical resistance of the magnetoresistive material may depend on a strength and/or a direction of the magnetic field present at the magnetoresistive material. Here, sensing element 510 may operate based on an anisotropic magnetoresistance (AMR) effect, a giant magnetoresistance (GMR) effect, a tunnel magnetoresistance (TMR) effect, and/or the like. As an additional particular example, sensing element 510 may include a variable reluctance (VR) based sensing element that operates based on induction.

Notably, the above-described examples of sensing element 510 are provided for illustrative purposes and, in practice, sensing element 510 may include any type of element capable of sensing a physical property and providing a signal corresponding to the physical property.

ADC 520 may include an analog-to-digital converter that converts an analog signal from the set of sensing elements 510 to a digital signal. For example, ADC 520 may convert analog signals, received from the set of sensing elements 510, into digital signals to be processed by DSP 530. ADC 520 may provide the digital signals to DSP 530. In some implementations, magnetic sensor 106 may include one or more ADCs 520.

DSP 530 may include a digital signal processing device or a collection of digital signal processing devices. In some implementations, DSP 530 may receive digital signals from ADC 520 and may process the digital signals to form output signals (e.g., destined for a controller), such as an output signal that conveys sensor data, as described elsewhere herein.

Memory element 540 may include a read only memory (ROM) (e.g., an EEPROM), a random access memory (RAM), and/or another type of dynamic or static storage device (e.g., a flash memory, a magnetic memory, an optical memory, etc.) that stores information and/or instructions for use by magnetic sensor 106. In some implementations, memory element 540 may store information associated with processing performed by DSP 530. Additionally, or alternatively, memory element 540 may store configurational values or parameters for the set of sensing elements 510 and/or information for one or more other elements of magnetic sensor 106, such as ADC 520 or interface 550.

Interface 550 may include an interface via which magnetic sensor 106 may receive and/or provide information from and/or to another device in a system, such as a controller. For example, interface 550 may provide the output signal, determined by DSP 530, to the controller and may further receive information from the controller.

The number and arrangement of elements shown in FIG. 5 are provided as one or more examples. In practice, there may be additional elements, fewer elements, different elements, or differently arranged elements than those shown in FIG. 5. Furthermore, two or more elements shown in FIG. 5 may be implemented within a single element, or a single element shown in FIG. 5 may be implemented as multiple, distributed elements. Additionally, or alternatively, a set of elements (e.g., one or more elements) of magnetic sensor 106 may perform one or more functions described as being performed by another set of elements of magnetic sensor 106.

Figure 6:
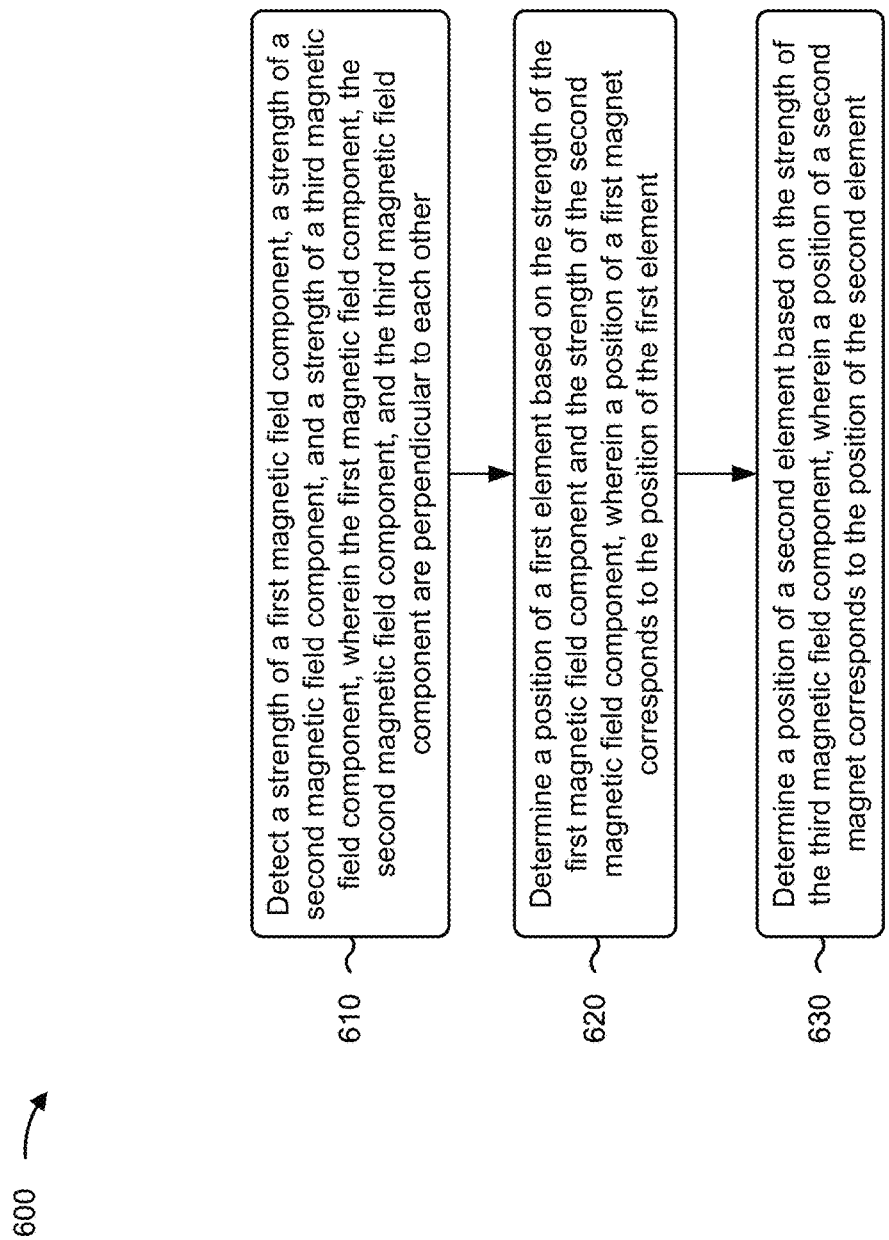
FIG. 6 is a flowchart of an example process associated with the contactless magnetic sensing trigger system described herein.

FIG. 6 is a flowchart of an example process 600 associated with the contactless magnetic sensing trigger system 100. In some implementations, one or more process blocks of FIG. 6 are performed by a magnetic sensor (e.g., magnetic sensor 106). In some implementations, one or more process blocks of FIG. 6 are performed by another device or a group of devices separate from or including the magnetic sensor, such as one or more sensing elements (e.g., one or more sensing elements 510), an ADC (e.g., ADC 520), a DSP (e.g., DSP 530), a memory (e.g., memory element 540), and/or an interface (e.g., interface 550).

As shown in FIG. 6, process 600 may include detecting a strength of a first magnetic field component, a strength of a second magnetic field component, and a strength of a third magnetic field component, wherein the first magnetic field component, the second magnetic field component, and the third magnetic field component are perpendicular to each other (block 610). For example, the magnetic sensor may detect a strength of a first magnetic field component, a strength of a second magnetic field component, and a strength of a third magnetic field component, wherein the first magnetic field component, the second magnetic field component, and the third magnetic field component are perpendicular to each other, as described above.

As further shown in FIG. 6, process 600 may include determining a position of a first element based on the strength of the first magnetic field component and the strength of the second magnetic field component, wherein a position of a first magnet corresponds to the position of the first element (block 620). For example, the magnetic sensor may determine a position of a first element based on the strength of the first magnetic field component and the strength of the second magnetic field component, wherein a position of a first magnet corresponds to the position of the first element, as described above.

As further shown in FIG. 6, process 600 may include determining a position of a second element based on the strength of the third magnetic field component, wherein a position of a second magnet corresponds to the position of the second element (block 630). For example, the magnetic sensor may determine a position of a second element based on the strength of the third magnetic field component, wherein a position of a second magnet corresponds to the position of the second element, as described above.

Process 600 may include additional implementations, such as any single implementation or any combination of implementations described below and/or in connection with one or more other processes described elsewhere herein.

In a first implementation, a magnetic field of the first magnet is confined to the first magnetic field component and the second magnetic field component.

In a second implementation, alone or in combination with the first implementation, a magnetic field of the second magnet is confined to the second magnetic field component and the third magnetic field component.

In a third implementation, alone or in combination with one or more of the first and second implementations, a magnetic field of the second magnet has a constant effect on the first magnetic field component and the second magnetic field component at the magnetic sensor, irrespective of the selected position of the second element.

In a fourth implementation, alone or in combination with one or more of the first through third implementations, the magnetic sensor comprises a 3D Hall sensor.

In a fifth implementation, alone or in combination with one or more of the first through fourth implementations, the first magnet is a dipole magnet.

In a sixth implementation, alone or in combination with one or more of the first through fifth implementations, the second magnet is a dipole magnet.

In a seventh implementation, alone or in combination with one or more of the first through sixth implementations, the sensor system is included in a power tool.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

Figure 7:
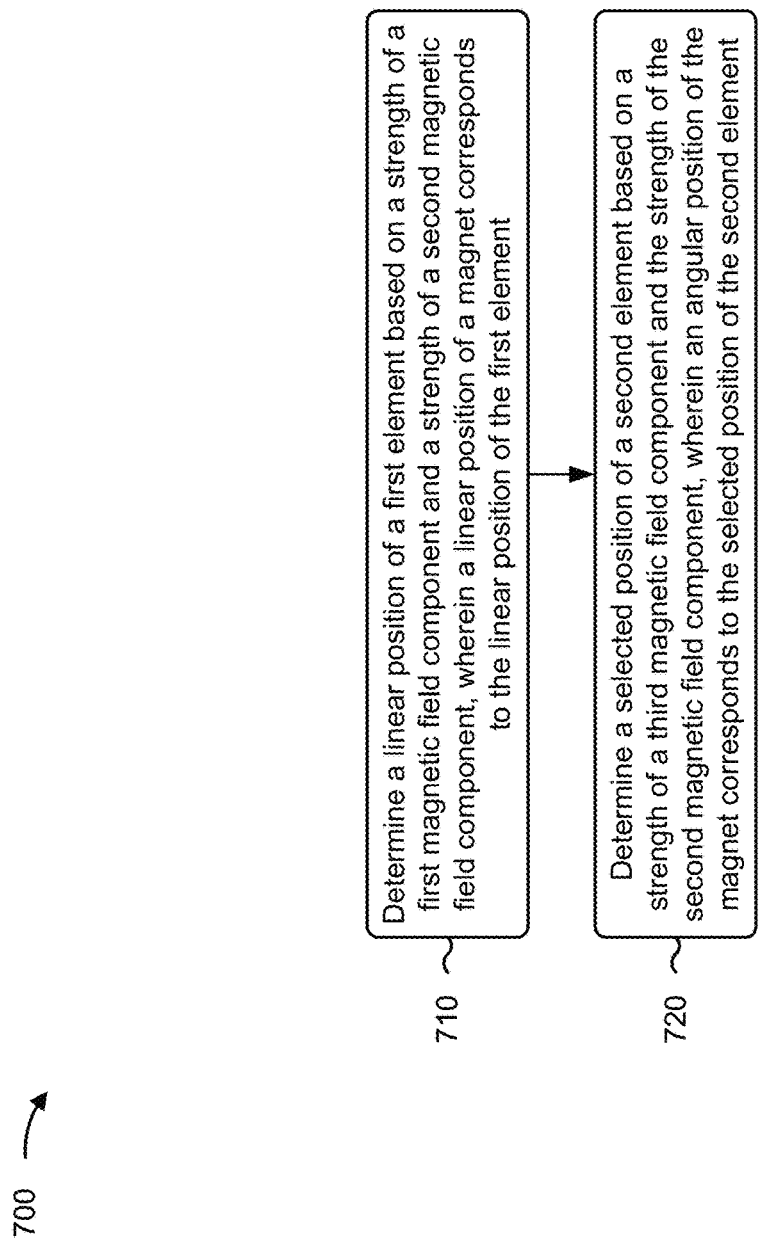
FIG. 7 is a flowchart of an example process associated with the contactless magnetic sensing trigger system described herein.

FIG. 7 is a flowchart of an example process 700 associated with the contactless magnetic sensing trigger system 300. In some implementations, one or more process blocks of FIG. 7 are performed by a magnetic sensor (e.g., magnetic sensor 106). In some implementations, one or more process blocks of FIG. 7 are performed by another device or a group of devices separate from or including the magnetic sensor, such as one or more sensing elements (e.g., one or more sensing elements 510), an ADC (e.g., ADC 520), a DSP (e.g., DSP 530), a memory (e.g., memory element 540), and/or an interface (e.g., interface 550).

As shown in FIG. 7, process 700 may include determining a linear position of a first element based on a strength of a first magnetic field component and a strength of a second magnetic field component, wherein a linear position of a magnet corresponds to the linear position of the first element (block 710). For example, the magnetic sensor may determine a linear position of a first element based on a strength of a first magnetic field component and a strength of a second magnetic field component, wherein a linear position of a magnet (e.g., magnet 302) corresponds to the linear position of the first element, as described above.

As further shown in FIG. 7, process 700 may include determining a selected position of a second element based on a strength of a third magnetic field component and the strength of the second magnetic field component, wherein an angular position of the magnet corresponds to the selected position of the second element (block 720). For example, the magnetic sensor may determine a selected position of a second element based on a strength of a third magnetic field component and the strength of the second magnetic field component, wherein an angular position of the magnet corresponds to the selected position of the second element, as described above.

Process 700 may include additional implementations, such as any single implementation or any combination of implementations described below and/or in connection with one or more other processes described elsewhere herein.

In a first implementation, the magnet is rotatable about a linear trajectory along which the magnet is moveable.

In a second implementation, alone or in combination with the first implementation, determining the selected position of the second element comprises calculating the angular position of the magnet based on the strength of the third magnetic field component and the strength of the second magnetic field component, and determining the selected position of the second element based on the angular position of the magnet.

In a third implementation, alone or in combination with one or more of the first and second implementations, determining the linear position of the first element comprises calculating an angle of the magnet with respect to the magnetic sensor based on the strength of the first magnetic field component and the strength of the second magnetic field component, the angle of the magnet corresponding to the linear position of the magnet, and determining the linear position of the first element based on the angle of the magnet with respect to the magnetic sensor.

In a fourth implementation, alone or in combination with one or more of the first through third implementations, the magnetic sensor comprises a 3D Hall sensor.

In a fifth implementation, alone or in combination with one or more of the first through fourth implementations, the magnet is a dipole magnet.

In a sixth implementation, alone or in combination with one or more of the first through fifth implementations, the magnetic sensor is included in a power tool.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A sensor system, comprising:
   a magnet arranged such that:
      a linear position of the magnet corresponds to a position of a trigger element on a substantially linear trajectory, and
      an angular position of the magnet corresponds to a selected position of a selection element, the selected position being one of a plurality of selected positions; and
   a magnetic sensor to:
      determine the position of the trigger element based on a strength of a first magnetic field component and a strength of a second magnetic field component,
      determine the selected position of the selection element based on a strength of a third magnetic field component and the strength of the second magnetic field component,
         wherein the first magnetic field component, the second magnetic field component, and the third magnetic field component are perpendicular to each other; and
      output, based on determining the selected position, a signal associated with the selected position.

2. The sensor system of claim 1, wherein the magnet is arranged to be rotatable about the substantially linear trajectory along which the magnet is moveable.

3. The sensor system of claim 1, wherein the magnetic sensor, to determine the selected position of the selection element, is configured to:
   calculate the angular position of the magnet based on the strength of the third magnetic field component and the strength of the second magnetic field component, and
   determine the selected position of the selection element based on the angular position of the magnet.

4. The sensor system of claim 1, wherein the magnetic sensor, to determine the linear position of the trigger element, is configured to:
   calculate an angle of the magnet with respect to the magnetic sensor based on the strength of the first magnetic field component and the strength of the second magnetic field component, the angle of the magnet corresponding to the linear position of the magnet, and
   determine the position of the trigger element based on the angle of the magnet with respect to the magnetic sensor.

5. The sensor system of claim 1, wherein the magnetic sensor comprises a three-dimensional (3D) Hall sensor.

6. The sensor system of claim 1, wherein the magnet is a dipole magnet.

7. The sensor system of claim 1, wherein the sensor system is included in a power tool.

8. A device, comprising:
   a first element moveable along a first axis;
   a second element rotatable about or moveable on a second axis;
   a first magnet arranged such that a linear position of the first magnet represents a position of the first element with respect to the first axis;
   a second magnet arranged such that an angular position of the second magnet represents a selected position of the second element with respect to the second axis, the selected position being one of a plurality of selectable positions; and
   a magnetic sensor to:
      determine the linear position of the first element based on a strength of a first magnetic field component and a strength of a second magnetic field component,
      determine the selected position of the second element based at least in part on a strength of a third magnetic field component; and
      output, based on determining the selected position, a signal associated with the selected position.

9. The device of claim 8, wherein the first magnet and the second magnet are a single magnet.

10. The device of claim 9, wherein the single magnet is arranged to be rotatable about the first axis which the first element is moveable.

11. The device of claim 8, wherein the magnetic sensor, to determine the selected position of the second element, is configured to:
    calculate the angular position of the second element based on the strength of the third magnetic field component and the strength of the second magnetic field component, and
    determine the selected position of the second element based on the angular position of the second magnet.

12. The device of claim 8, wherein the magnetic sensor, to determine the linear position of the first element, is configured to:
    calculate an angle of the first magnet with respect to the magnetic sensor based on the strength of the first magnetic field component and the strength of the second magnetic field component, and
    determine the linear position of the first element based on the angle of the first magnet with respect to the magnetic sensor.

13. The device of claim 8, wherein the magnetic sensor comprises a three-dimensional (3D) Hall sensor.

14. The device of claim 8, wherein the first magnet is a dipole magnet.

15. The device of claim 8, wherein the second magnet is a dipole magnet.

16. The device of claim 8, wherein the device is a power tool.

17. A method, comprising:
    determining, by a magnetic sensor, a linear position of a first element based on a strength of a first magnetic field component and a strength of a second magnetic field component,
    wherein a linear position of a magnet corresponds to the linear position of the first element;
    determining, by the magnetic sensor, a selected position of a second element based on a strength of a third magnetic field component and the strength of the second magnetic field component,
    wherein an angular position of the magnet corresponds to the selected position of the second element; and
    outputting, based on determining the selected position, a signal associated with the selected position.

18. The method of claim 17, wherein the magnet is rotatable about a linear trajectory along which the magnet is moveable.

19. The method of claim 17, wherein determining the selected position of the second element comprises:
    calculating the angular position of the magnet based on the strength of the third magnetic field component and the strength of the second magnetic field component, and
    determining the selected position of the second element based on the angular position of the magnet.

20. The method of claim 17, wherein determining the linear position of the first element comprises:
    calculating an angle of the magnet with respect to the magnetic sensor based on the strength of the first magnetic field component and the strength of the second magnetic field component, the angle of the magnet corresponding to the linear position of the magnet, and
    determining the linear position of the first element based on the angle of the magnet with respect to the magnetic sensor.

* * * * *